United States Patent
Chelminski

(10) Patent No.: US 12,411,255 B2
(45) Date of Patent: *Sep. 9, 2025

(54) DEVICE FOR MARINE SEISMIC EXPLORATIONS

(71) Applicant: SERCEL, INC., Houston, TX (US)

(72) Inventor: Stephen Chelminski, Houston, TX (US)

(73) Assignee: SERCEL, INC ( * ) Notice: Subject to any disclaimer, the term of this patent is extended or adjusted under 35 U.S.C. 154(b) by 112 days.

This patent is subject to a terminal disclaimer.

(21) Appl. No.: 18/274,718

(22) PCT Filed: Feb. 4, 2022

(86) PCT No.: PCT/US2022/015202
§ 371 (c)(1),
(2) Date: Jul. 28, 2023

(87) PCT Pub. No.: WO2022/170029
PCT Pub. Date: Aug. 11, 2022

(65) Prior Publication Data
US 2024/0118440 A1    Apr. 11, 2024

Related U.S. Application Data

(63) Continuation-in-part of application No. 17/551,770, filed on Dec. 15, 2021, now Pat. No. 11,953,634.

(60) Provisional application No. 63/146,682, filed on Feb. 7, 2021.

(51) Int. Cl.
*G01V 1/137*    (2006.01)
*G01V 1/143*    (2006.01)

(52) U.S. Cl.
CPC .............. *G01V 1/137* (2013.01); *G01V 1/143* (2013.01)

(58) Field of Classification Search
CPC ............................. G01V 1/137; G01V 1/143
See application file for complete search history.

(56) References Cited

U.S. PATENT DOCUMENTS

| | | |
|---|---|---|
| 3,379,603 A | 4/1968 | Barnette |
| 4,038,630 A | 7/1977 | Chelminski |
| 4,599,712 A | 7/1986 | Chelminski |
| 4,601,924 A | 7/1986 | Birkes et al. |
| 4,712,202 A | 12/1987 | Chelminski |

(Continued)

OTHER PUBLICATIONS

International Search Report dated May 23, 2022.
Examination Report dated Apr. 4, 2024.
European Search Report dated Oct. 31, 2024.

*Primary Examiner* — Isam A Alsomiri
*Assistant Examiner* — Abdallah Abulaban
(74) *Attorney, Agent, or Firm* — IPSILON USA, LLP

(57) ABSTRACT

A seismic source for generating seismic waves under water includes an operating head having an operating chamber, a cushion chamber, and discharge ports, a firing chamber attached to the operating head, the firing chamber configured to hold compressed air to be discharged through the discharge ports, and a shuttle assembly having a shaft located within the operating head and configured to prevent the compressed air in the firing chamber to enter the discharge ports when in a close state, and to allow the compressed air in the firing chamber to be discharged through the discharge ports when in an open state. The shaft of the shuttle assembly which extends in both the operating chamber and the cushion chamber, has a channel having a varying depth.

18 Claims, 14 Drawing Sheets

(56) References Cited

U.S. PATENT DOCUMENTS

| | | |
|---|---|---|
| 4,757,482 A | 7/1988 | Fiske, Jr. |
| 4,779,245 A | 10/1988 | Chelminski |
| 5,315,917 A | 5/1994 | Mayzes |
| 5,432,757 A | 7/1995 | Chelminski |
| 5,646,910 A | 7/1997 | Bouyoucos |
| 7,269,099 B2 | 9/2007 | Jensen |
| 7,321,560 B2 | 1/2008 | Ano et al. |
| 8,223,591 B2 | 7/2012 | Chelminski |
| 8,971,152 B2 | 3/2015 | Chelminski |
| 10,473,805 B2 | 11/2019 | Sercel |
| 2010/0320027 A1 | 12/2010 | Chelminski |
| 2013/0051180 A1 | 2/2013 | Chelminski |
| 2014/0238772 A1 | 8/2014 | Chelminski |
| 2015/0129349 A1 | 5/2015 | Chelminski |
| 2019/0086563 A1 | 3/2019 | Chelminski et al. |

DEVICE FOR MARINE SEISMIC EXPLORATIONS

RELATED APPLICATION

This application is a National Phase of PCT/US2022/015202 filed on Feb. 4 2022, which claims the benefit of priority from U.S. Patent Application Nos. 63/146,682, filed on Feb. 7, 2021, and Ser. No. 17/551,770 filed on Dec. 15, 2021, the entirety of which are incorporated by reference.

FIELD OF THE INVENTION

The present embodiments relate to a pneumatic seismic source intended for use in generating seismic energy impulses, i.e., acoustical waves, in a body of water that provides improved performance by forming a substantially round output pulse bubble. The seismic source of the present embodiments further provides for adjusting the length of the sealing surface for a firing seal in order to adjust the frequency content in the output pulse. By selecting the length of the sealing surface of the firing seal, a desired mixture of low and moderately high frequencies may be achieved to help in mitigating damage to marine life and the marine environment and to provide greater penetration of the seismic signal through, for example, salt, salt-dome, basalt and sub-basalt structures.

BACKGROUND OF THE INVENTION

Seismic sources, as used herein, are sound sources for marine seismic exploration. The operating components of seismic sources include a firing chamber holding a charge of gas under high pressure, a two-piston shuttle assembly having a firing piston which retains the charge of pressurized gas within the firing chamber, and an operating piston positioned within an operating chamber, where the highly pressurized gas acts against the operating piston to maintain the shuttle assembly in a closed position until firing. The seismic source is triggered using a solenoid operated valve to release pressurized air into the operating chamber actuating the shuttle assembly to cause an abrupt discharge of the pressurized air from the firing chamber through discharge ports and directly into the surrounding water creating an acoustic pulse.

Seismic sources as deep penetration sound sources produce output frequencies generally between 7-10 Hz to about 1200 Hz, to identify subsurface geologic layers and define the subsurface structure. A frequency between 10 and 40 Hz is considered herein to be a low frequency, a frequency between 40 and 100 Hz is considered herein to be a high frequency, and a frequency larger than 100 Hz is considered to herein to be a very high frequency. Seismic sources of the prior art are typically fired at compressed air pressures in the range of 1500-2000 psi (10,342-13,789 MPa) to 3000 psi (20,684 MPa). These conventional seismic sources produce an initial pulse or primary pressure pulse typically of about 1.5 milliseconds (ms) of rise time to reach a peak pressure. This extremely fast rise time produces an abundance of very high frequency sound components in the primary pressure pulse, which are outside of the frequency range of interest and therefore may not be beneficial in the identification of subsurface geological structures. It is important in the exploration industry that these undesirable very high frequencies be reduced or eliminated and the embodiments discussed herein achieve exactly that. The inventor hereof has provided various embodiments in the field of seismic sources, described in patents such as U.S. Pat. Nos. 3,379,603, 4,038,630, 4,601,924, 4,599,712, 4,712,202, 4,779,245, 5,432,757, 8,223,591, 8,971,152 and U.S. Patent Application US2019/086563. There are also some other inventors in the same field such as Fiske, U.S. Pat. No. 4,757,482, Mayzes, U.S. Pat. No. 5,315,917, Jensen, U.S. Pat. No. 7,269,099, Hopperstad, U.S. Pat. No. 7,321,560 and others.

OBJECTS AND SUMMARY OF THE INVENTION

According to an embodiment, it is proposed a seismic source for generating seismic waves under water, the seismic source comprising an operating head having plural discharge ports; a firing chamber attached to the operating head, the firing chamber configured to hold compressed air to be discharged through the plural discharge ports; and a shuttle assembly having a shaft located within the operating head and shuttle assembly is configured to prevent the compressed air in the firing chamber to enter the plural discharge ports when in a close state, and to allow the compressed air in the firing chamber to be discharged through the plural discharge ports when in an open state. The shaft has a longitudinal channel having a varying depth.

According to an embodiment, the operating head having an operating chamber and a cushion chamber, the shaft extends in both the operating chamber and the cushion chamber.

According to embodiments, it is proposed a seismic source for generating seismic waves under water, the seismic source comprising: an operating head having discharge ports; a firing chamber attached to the operating head, the firing chamber configured to hold compressed air to be discharged through the discharge ports; and a shuttle assembly having a shaft located within the operating head and configured to prevent the compressed air in the firing chamber to enter the discharge ports when in a close state, and to allow the compressed air in the firing chamber to be discharged through the discharge ports when in an open state. The shaft of the shuttle assembly has a longitudinal channel having a varying depth.

According to embodiments, it is proposed a seismic source for generating seismic waves under water, the seismic source comprising: an operating head having discharge ports; a firing chamber attached to the operating head, the firing chamber configured to hold compressed air to be discharged through the discharge ports; and a shaft located within the operating head and configured to move between a close state, in which the compressed air in the firing chamber is preventing from reaching the discharge ports, and an open state, in which the compressed air in the firing chamber is discharged through the discharge ports. The shaft has a longitudinal channel having a varying depth.

One or more of the present embodiments have dramatic and critically important differences over seismic sources of the prior art, particularly in forming the output pulse as a substantially round bubble by increasing the number of discharge ports to greater than four and preferably eight and by removing interfering suspension lines and rigging from the bubble discharge area. The seismic source of one or more embodiments operates at operating pressures in the range of 600 psi (4,137 MPa)-1200 psi (8,274 MPa) and more preferably at 1000 psi (6,895 MPa) and further provides a sealing ring that adjusts the acceleration distance of the shuttle assembly in order to adjust the mixture of low and high frequencies within the frequency content of the output pulse. The seismic source of the one or more embodiments further improves the sealing of the operating flange after firing to enable the seismic source to be fired more quickly and accurately and re-seal more accurately as the shuttle assembly returns to the set position after firing. In one embodiment, the seismic source of the one or more embodiments reduces and even eliminates the very high frequencies when compared to the existing sources and/or reduces the high frequencies.

The seismic source of one or more embodiments includes an operating head having an operating chamber and discharge ports and a firing chamber. In embodiments of the seismic source of the present invention, the firing chamber is of an extended length to increase the low frequencies within the output pulse, to provide greater penetration of the seismic signal through, for example, salt, salt-dome, basalt and sub-basalt structures and to reduce undesirable and unusable high and very high frequencies that may be a source of damage to marine mammals and fish. Embodiments of the firing chamber can be at a length from about four feet (1,219 meters) to as much as thirty feet (9,144 meters) with a diameter from about a half of foot (0,1524 meter) to about three feet (0,914 meter) providing volumes, for example, in the range of 26,000 cu. in. (426 liters) and 120,000 cu. in. (1966 liters).

The seismic source of one or more embodiments is towed behind an exploration vessel using a float or A-frame structure. Suspension line attachment points are provided along the firing chamber away from the discharge ports and operating head to remove interference of suspension lines and rigging with the output pulse bubble of the seismic source. Near-field hydrophones or other equipment may be attached to the rigging or firing chamber. An umbilical cable is also attached to the firing chamber away from the discharge ports and operating head provides pneumatic supply lines and electrical cables.

The unique firing seal sealing ring of the present invention adjusts the length between the firing piston and the discharge ports thereby increasing or decreasing the acceleration distance. A decrease in the acceleration distance increases the low frequency content of the output pulse. An increase in the acceleration distance between the firing chamber seal and the discharge ports decreases the rise time and boosts high frequencies within the output pulse, which is undesired. The firing seal sealing ring prevents leakage of air from the firing chamber prior to firing thereby removing objectionable or unusable high and very high frequencies caused by leakage of high pressure air past the firing piston as it accelerates before opening to the ports.

The seismic source of one or more embodiments further provides a shuttle assembly vent channel having a varying profile that releases air from the operating chamber after firing. Because the channel is close to the center of the operating chamber, along the shuttle shaft, an annular groove near the edge of the operating flange of the shuttle assembly can be completely filled with air prior to firing, thus holding the release of air from the operating chamber until after firing, and thereby providing more accuracy in firing and providing faster movement of the shuttle assembly back to the reset ready to fire position.

It is object and advantage of the present invention to assemble embodiments of a seismic source having more than four discharge ports and preferably eight discharge ports.

It is object and advantage of the present invention to assemble embodiments of a seismic source having more than four discharge ports and thereby forming the shape of the output pulse as a substantially round bubble.

It is object and advantage of the present invention to assemble embodiments of a seismic source having eight discharge ports and thereby forming the shape of the output pulse as a substantially round bubble.

It is object and advantage of the present invention to assemble embodiments of a seismic source having the attachment suspension lines and rigging away from and out of line with the output pulse bubble from the discharge ports thereby preventing damage to the suspension lines and rigging by the intense discharge of high pressure compressed from the ports when the source is fired.

It is object and advantage of the present invention to assemble embodiments of a seismic source having the attachment of the umbilical cable attached to the firing chamber away from and out of line with the output pulse bubble from discharge ports and thereby preventing damage to the umbilical by the intense discharge of high pressure compressed air from the ports when the source is fired.

It is another object and advantage of the present invention to assemble embodiments of a seismic source that may have a firing seal sealing ring that prevents the release air from the firing chamber prior to firing of the seismic source.

It is another object and advantage of the present invention to assemble embodiments of a seismic source that provides the selection of a firing seal sealing ring of a specific length to adjust the acceleration distance and thereby the mixture of low and high frequencies within the frequency content of the output pulse of the seismic source of the present invention.

It is another object and advantage of the present invention to assemble embodiments of a seismic source that may have a firing seal installed at the outward facing edge of the firing piston that seals along a firing seal sealing ring that prevents the release air from the firing chamber prior to firing of the seismic source.

It is another object and advantage of the present invention to assemble embodiments of a seismic source that may have a shuttle assembly shaft orifice for the release of air from the operating chamber after firing, to efficiently reset the operating flange in a ready to fire position.

One embodiment of the present invention is related to a seismic source, including an operating head having an operating chamber and discharge ports; a firing piston movable within the operating chamber; a firing chamber attached to the operating head, the firing chamber configured to attach supporting structure away from and out of line with the output pulse bubble from the discharge ports; and wherein the output pulse bubble does not take place within the bounds of a supporting structure. In embodiments of the seismic source of the present invention, the supporting structure includes at least one of suspension lines, rigging and an umbilical cable; and the bubble and oscillations of the bubble pulse do not take place within the bounds of the supporting structure when and after the seismic source is triggered and fired. Upon firing of the seismic source of the present embodiment, the output pulse is a substantially round bubble. In some embodiments of the seismic source, the operating head has at least five discharge ports and other embodiments the seismic source of the present invention, the operating head has at least eight discharge ports. In embodiments of the seismic source of the present invention, the firing chamber includes a heavy metal nose of sufficient weight to serve as a counterweight to the weight of the operating head and the firing chamber to act as ballast to the seismic source when firing. In embodiments of the seismic source of the present invention, the firing chamber has a length that is at least eight times the outside diameter of the operating head at the discharge ports providing further separation of the support structure comprising at least one of suspension lines, rigging and an umbilical cable from the discharge ports to prevent the interference of the support structure from the maximum radius of the first expansion of the bubble formed from the output pulse when firing the seismic source. Embodiments of the seismic source of the present invention include a shuttle shaft having a shuttle shaft vent channel configured to release pressurized air from the operation chamber after firing in order to reset the seismic source to a ready to fire position. In some embodiments, the shuttle shaft vent channel is configured to have varying depths to provide for varied rates of air flow through the shuttle shaft vent channel when the seismic source is reset to the ready to fire position. Embodiments of the seismic source of the present invention includes an operating seal; an operating flange having an annular groove, the operating flange configured to seal to the operating seal in a reset ready to fire position; a shuttle shaft having a shuttle shaft vent channel, the shuttle shaft vent channel configured to release pressurized air from the operating chamber; and wherein upon firing of the seismic source, the annular groove completely fills; and wherein after firing, air is released from the operating chamber through the shuttle shaft vent channel allowing the operating flange to seal against the operating seal to reset the seismic source to a ready to fire position. Embodiments of the seismic source of the present invention include a firing seal sealing ring configured to seal the firing piston to the firing chamber prior to firing the seismic source. In some embodiments, the sealing surface of the firing seal sealing ring is of a desired length and through the selection of the length the firing seal sealing ring is configured to adjust the acceleration distance to set a mixture of low and/or high frequencies in the frequency content of the output pulse. Embodiments of the seismic source of the present invention include a firing seal installed on a firing piston. Embodiments of the seismic source of the present invention include a firing seal installed facing outwardly on a firing piston. Embodiments of the seismic source of the present invention include a cup-shaped firing piston having a firing seal. Embodiments of the seismic source of the present invention include a cup shaped firing piston having a firing seal facing outwardly.

Another embodiment of the present invention is related to a seismic source, including a housing having an operating chamber and discharge ports; a shuttle shaft having a shuttle shaft vent channel configured to release pressurized air from the operation chamber after firing in order to reset the seismic source to a ready to fire position; a firing piston movable within the housing; a firing chamber attached to the housing; and wherein upon firing of the seismic source, air is released from the firing chamber through the discharge ports creating an output pulse and after firing, air is released from the operating chamber through the shuttle shaft vent channel to reset the seismic source to a ready to fire position.

Yet another embodiment of the present invention is related to a seismic source, including a housing having an operating chamber and discharge ports; a firing piston movable within the housing; a firing chamber attached to the housing; a firing seal sealing ring configured to seal the firing piston to the firing chamber prior to firing the seismic source. In embodiments of the seismic source of the present invention, the firing seal sealing ring has a sealing surface of a desired length and through the selection of the length, the firing seal sealing ring is configured to adjust the acceleration distance to set a mixture of low and/or high frequencies in the frequency content of the output pulse. Embodiments of the firing piston of the seismic source of the present invention have a firing seal.

These and other features, advantages and improvements according to these embodiments will be better understood by reference to the following detailed description and accompanying drawings. While references may be made to upper, lower, vertical and horizontal, these terms are used merely to describe the relationship of components and not to limit the operation of the present invention to any one orientation.

According to embodiments, it is proposed a seismic source, that can be according to any one the above embodiments, wherein the seismic source if configured so that, when triggered beneath the surface of a body of water, the operating head is free to move, preferably to pivot, upwardly and downwardly, without mechanical restraint in reaction to the forces applied to it by an air bubble, where the motion of the seismic source is dampened in a non-destructive manner by the surrounding water.

Such configuration enables to limit or avoid damages to the source due to the strong forces applied to the source.

When fired, a source can thus pivot upwardly at the operating head end as manipulated by action of the bubble.

It is fortunate to have a source which can be towed behind an exploration vessel as a single point source, and that, when triggered, does not require restraint and is free to pivot upwardly and settle back to the horizontal position in a gentle manner as cushioned by the surrounding water.

BRIEF DESCRIPTION OF THE DRAWINGS

The embodiments, together with further objects, features, aspects and advantages thereof will be more fully understood and appreciated by consideration of the following description in conjunction with the accompanying drawings in which the respective elements bear the same reference numerals throughout the various views.

DETAILED DESCRIPTION OF THE INVENTION

Figure 1:
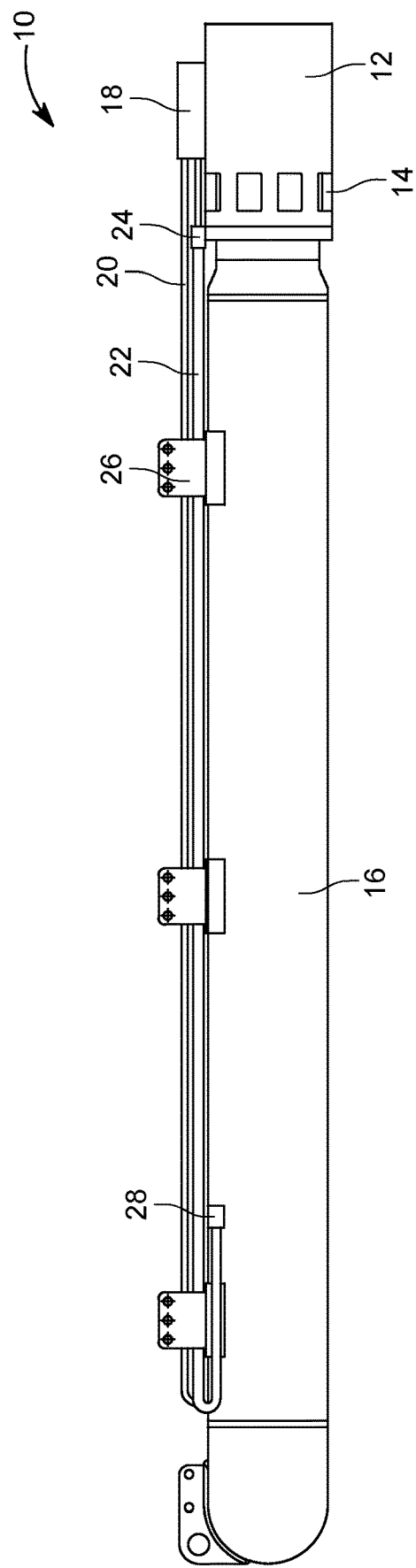
FIG. 1 is an elevation view of an embodiment of the seismic source of the present invention.

A seismic source 10 according to an embodiment is illustrated in FIG. 1 and includes an operating head 12 having plural discharge ports 14, and a firing chamber 16 connected to the operating head 12. Affixed to the operating head 12 is a control block 18 connected to pipe 20 and connected to an air supply line 22 through an air distribution fitting 24. Within the pipe 20 are electrical cables that transport commands and/or power from the towing vessel to the control block 18, for controlling the firing of the source. The pipe 20 and the air supply line 22 are directed along the firing chamber 16 and securely attached to tow ears 26 affixed only to the firing chamber 16, not to the operating head. Note that the pipe 20 and the air supply line 22 extend from one end of the operating head 12 to an end of the firing chamber 16, where these two ends are located at opposite ends of the source 10. Also note that there are no tow ears 26 or other structures directly attached to the operating head 12, so that no ropes or chains connect the operating head 12 to a float, which is discussed later.

Figure 2A:
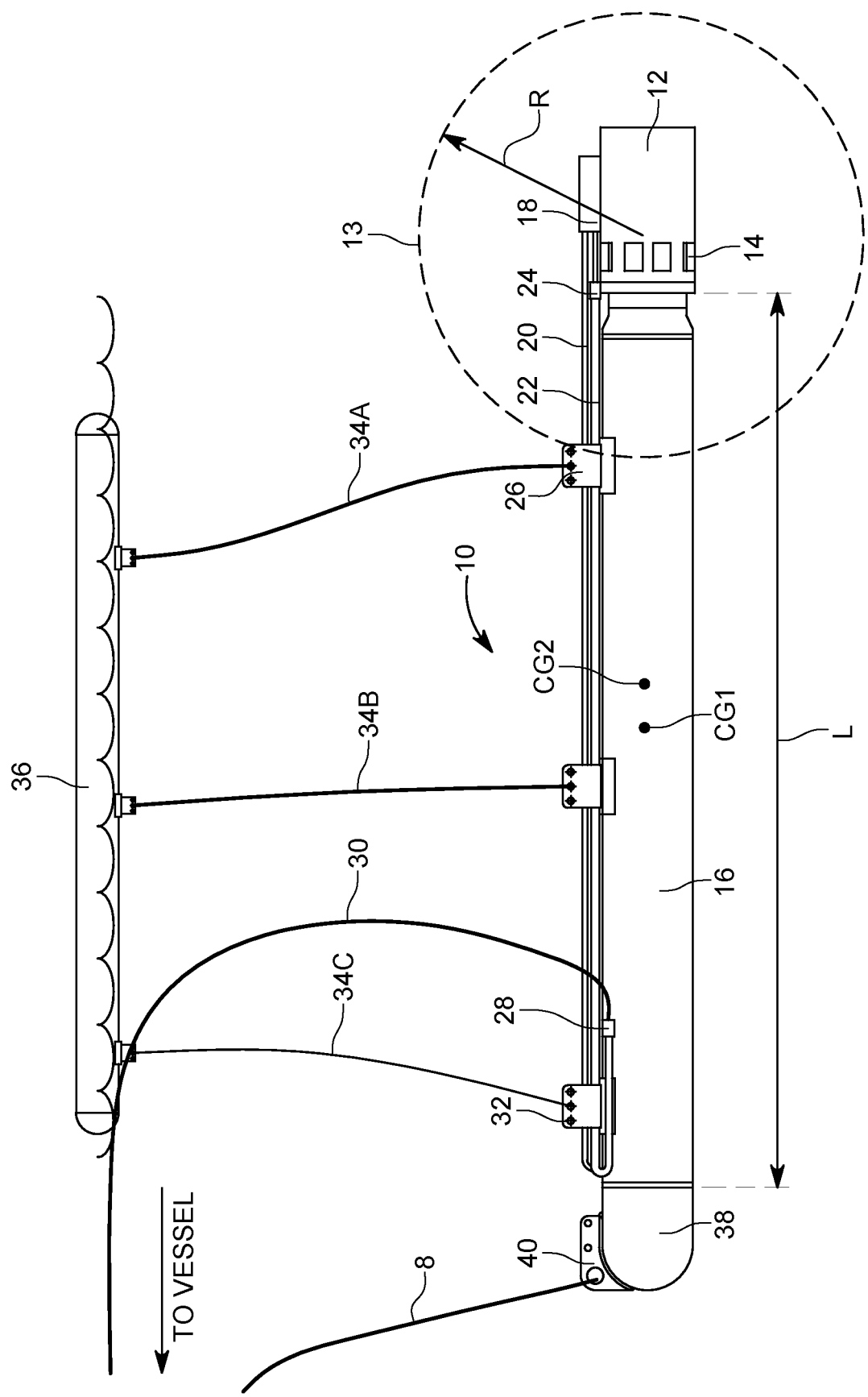
FIG. 2A is an elevation view of an embodiment of the seismic source of the present invention in deployment with a float.

A supply connector 28 at the front of the firing chamber 16 is configured for the attachment to an umbilical cable 30 (see FIG. 2A) from the supply vessel. The one or more electrical cables within the pipe 20 and the air supply line 22 are connected at the supply connector 28 to the electrical cables and air supply from the supply vessel through the umbilical cables 30, as shown in FIG. 2A. The tow ears 26 also provide attachment points 32 for suspension lines 34A-34C that attach the seismic source 10 to an A-frame or float 36 and provide for adjusting the depth of the seismic source 10 relative to the water surface, for example, to depths of between 5 meters to 30 meters for firing. Note that no suspension line is attached to the operating head 12.

The nose 38 of the firing chamber 16 has a nose flange 40 configured for the attachment of a main line 8 from the exploration vessel. The nose 38 of the firing chamber 16 is made of heavy metal of sufficient weight to serve as a counterweight to the weight of the operating head 12 and the firing chamber, to act as ballast to the seismic source 10 to assure the center of gravity CG1 of the entire source will be at or close to the center of gravity CG2 of the firing chamber 16 so that the suspension line 34A, which is furthest in the rear towards the operating head 12, is forward of the maximum radius R of the output pulse bubble 13 when the source 10 is fired.

The alignment of the pipe 20 and air supply line 22 along the firing chamber 16 and the attachment of the suspension lines 34A to 34C and umbilical cable 30 away from the operating head 12 and discharge ports 14 removes any interference of or damage to lines, cabling or other rigging with the output pulse bubble which is quite different from the rigging attachments of the prior art. In this regard, note that the pipe and the air supply line 22 are located between adjacent discharge ports 14, when extending over the operating head 12, and not directly above any port 14.

Figure 2B:
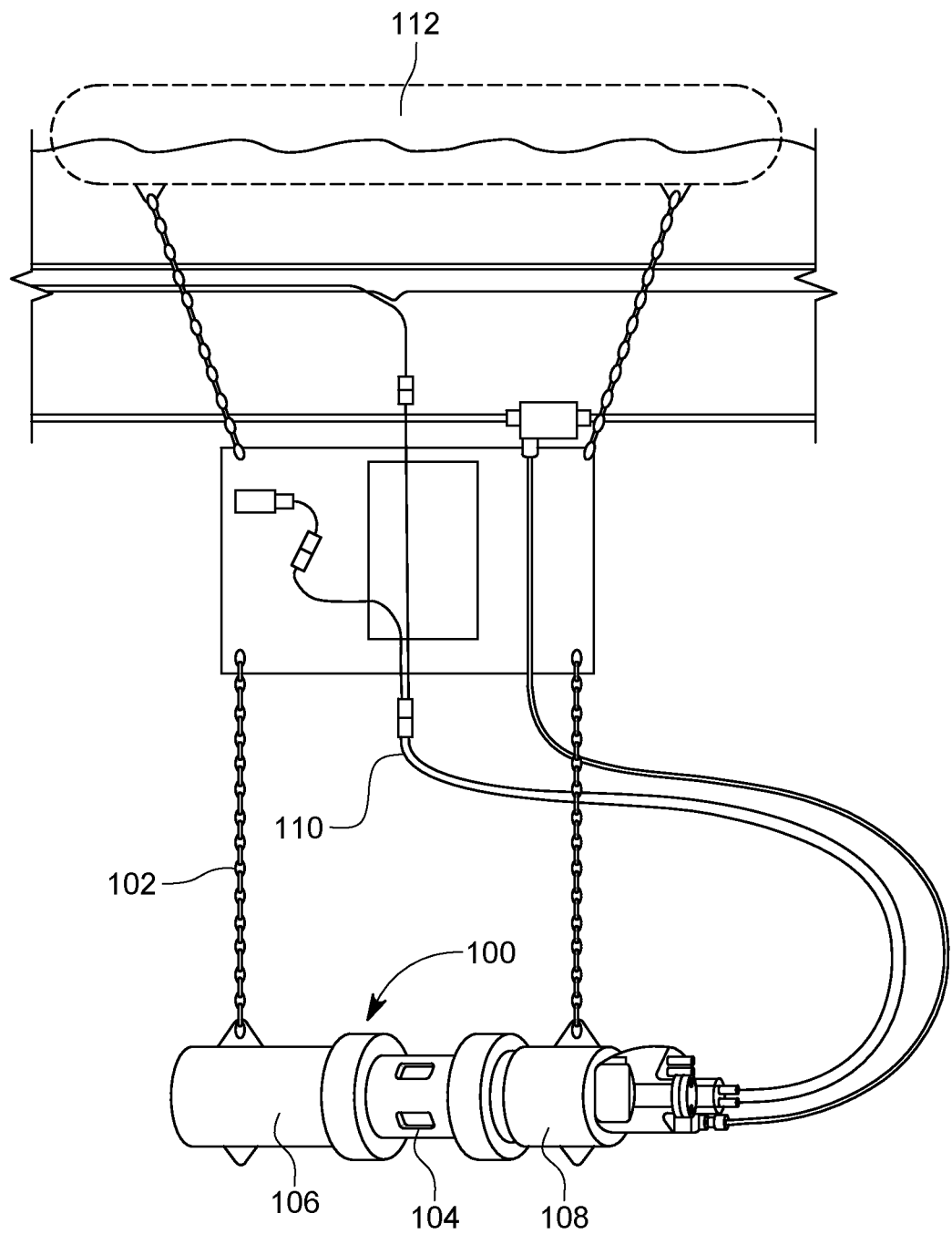
FIG. 2B is a perspective view of an embodiment of a seismic source of the prior art in deployment with a float.

In a seismic source 100 of the prior art, an example of which is shown in FIG. 2B, the suspension lines 102 of rope, chains, or synthetic fibers are on either side of the discharge ports 104 with one suspension line attached to the firing chamber 106 and the other suspension line attached to the operating head 108. The compressed air hose and electrical cables 110 extend directly from below the float 112, between the suspension lines 102, so that they are located directly above the discharge ports 104. When firing the seismic source 100 of the prior art, the compressed air hose and electrical cables 110 and suspension lines 102 can be severely damaged from the interaction of the explosive force of the output pulse where the formation and collapse of the air bubble within the water can cause fraying or breaking of the compressed air hose and electrical cables 110 and suspension lines 102. Damage to the rigging requires that firing of the prior art seismic source 100 be stopped and be towed back to the exploration vessel for repair and or replacement of the rigging due to this damage. The unique alignment of the rigging away from the discharge ports 14 of the seismic source 10 of the present invention provides for thousands of shots to be taken without any requirement for maintenance, repair, or replacement of the suspension lines 34A, 34B, and 34C.

Figure 3B:
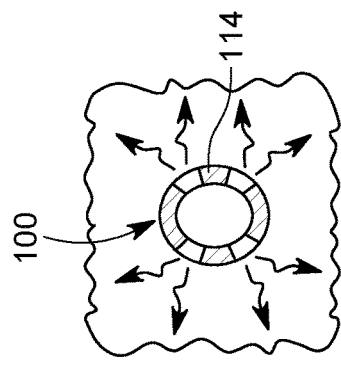
FIG. 3B is an illustration of an embodiment of the shape of the output pulse bubble of a seismic source of the prior art of FIG. 3A.
Figure 3A:
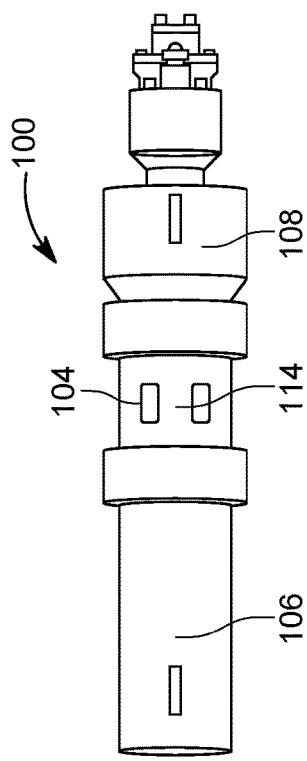
FIG. 3A is an elevation view of an embodiment of a seismic source of the prior art.

As shown in FIG. 3A, a seismic source 100 of the prior art commonly uses an operating pressure of ~2000 psi (13,789 MPa), which results in a rise time of the primary pressure pulse of typically between 1.5 to 2.0 milliseconds. This higher operating pressure requires thicker walls of steel for the firing chamber 106 and operating head housing 108 due to the structural integrity required to sustain such high-pressure operation. The seismic sources of the prior art therefore normally have at most four small discharge ports 104 with large structural braces 114 between the discharge ports 104 in order to maintain sufficient structural integrity when firing. In the example shown, the prior art seismic source 100 has four discharge ports 104 with the discharge ports 104 evenly spaced around the operating head 108. When firing, the release of air is directed out of the discharge ports 104 of the seismic source 100 forming the bubble of the output pulse in a substantially square shape with squared off corners, as shown in a cross-section through the discharge ports 104 in FIG. 3B.

Figure 4B:
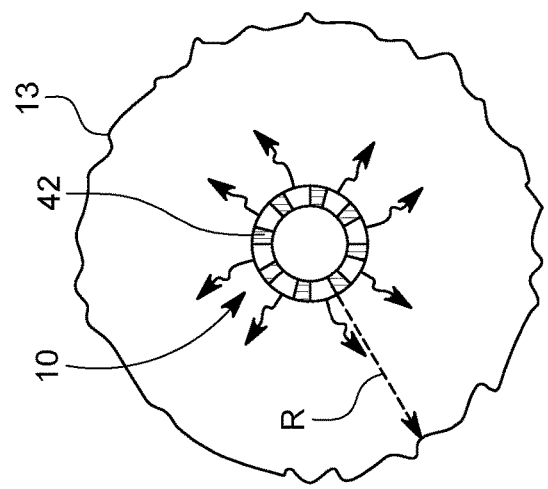
FIG. 4B is an illustration of an embodiment of the shape of the output pulse bubble of the seismic source of the present invention of FIG. 4A.
Figure 4A:
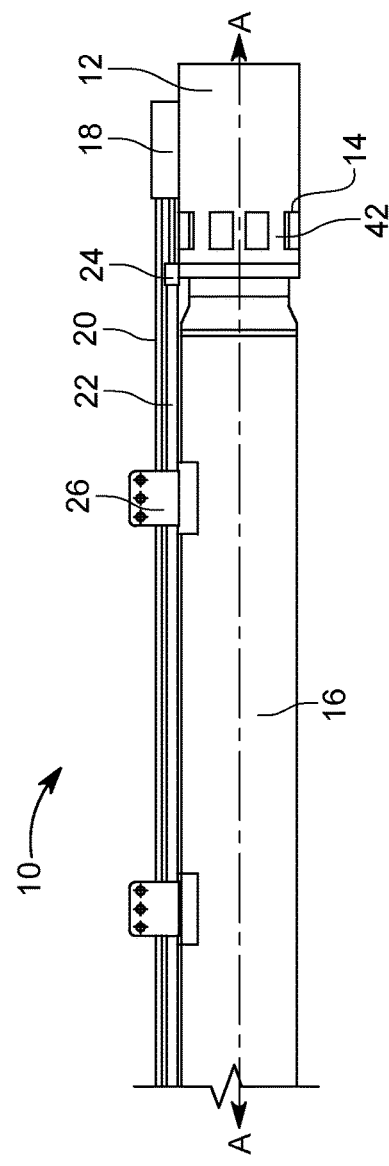
FIG. 4A is an elevation view of an embodiment of the seismic source of the present invention.

The seismic source 10 of the present embodiment is designed to work at lower operating pressures, within ranges of 200 psi (1,379 MPa)-1200 psi (8,274 MPa) and therefore, the size of the brace support posts 42 between the discharge ports 14 can be decreased and the number of discharge ports 14 can be increased while still maintaining the structural integrity necessary to sustain the release of air through the discharge ports 14 when firing. As shown in FIG. 4A, the seismic source 10 may have more than four discharge ports 14 and preferably has eight discharge ports 14 that are machined through the operating head 12 to form an almost 360° release of air when firing. By radially spacing the discharge ports 14 around the center axis A as shown, the seismic source 10 of the present invention provides for the formation of a substantially round bubble 13 of the output pulse as shown in FIG. 4B. By forming a substantially round bubble 13, the output pulse of the seismic source 10 of the present invention oscillates closer to a sine wave shape, allowing the output signal to be more pure in the natural frequency of the bubble pulse, thus increasing the useful energy output to enhance the penetration of the pulse through deep and hard to penetrate geological structures.

In one embodiment, the seismic source 10 includes a firing chamber 16 having a length L (see FIG. 2A) that is at least eight times the outside diameter D of the operating housing 50 (see FIG. 5A) at the discharge ports 14, thus providing further separation of the suspension lines 34A to 34C and other rigging and the umbilical cable 30 from the discharge ports 14 to prevent the interference of the suspension lines 34A to 34C or other rigging and the umbilical cable 30 from the maximum radius R of the first expansion of the bubble 13 formed from the output pulse when firing the seismic source 10.

Figure 5A:
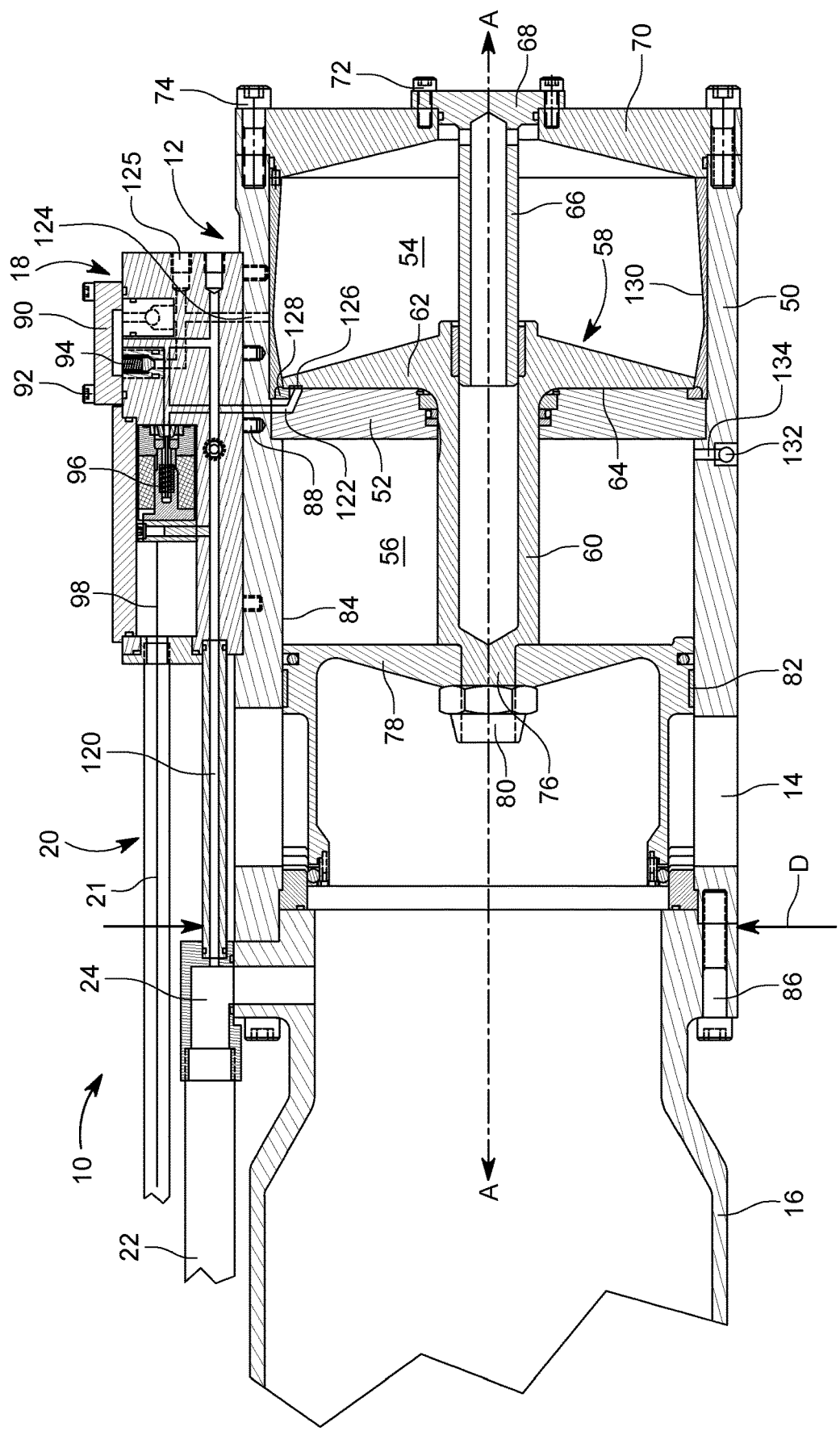
FIG. 5A is a cross-sectional view of an embodiment of the seismic source of the present invention and FIG. 5B is a cross-sectional view of an embodiment of a part of the seismic source shown in FIG. 5A.
Figure 5B:
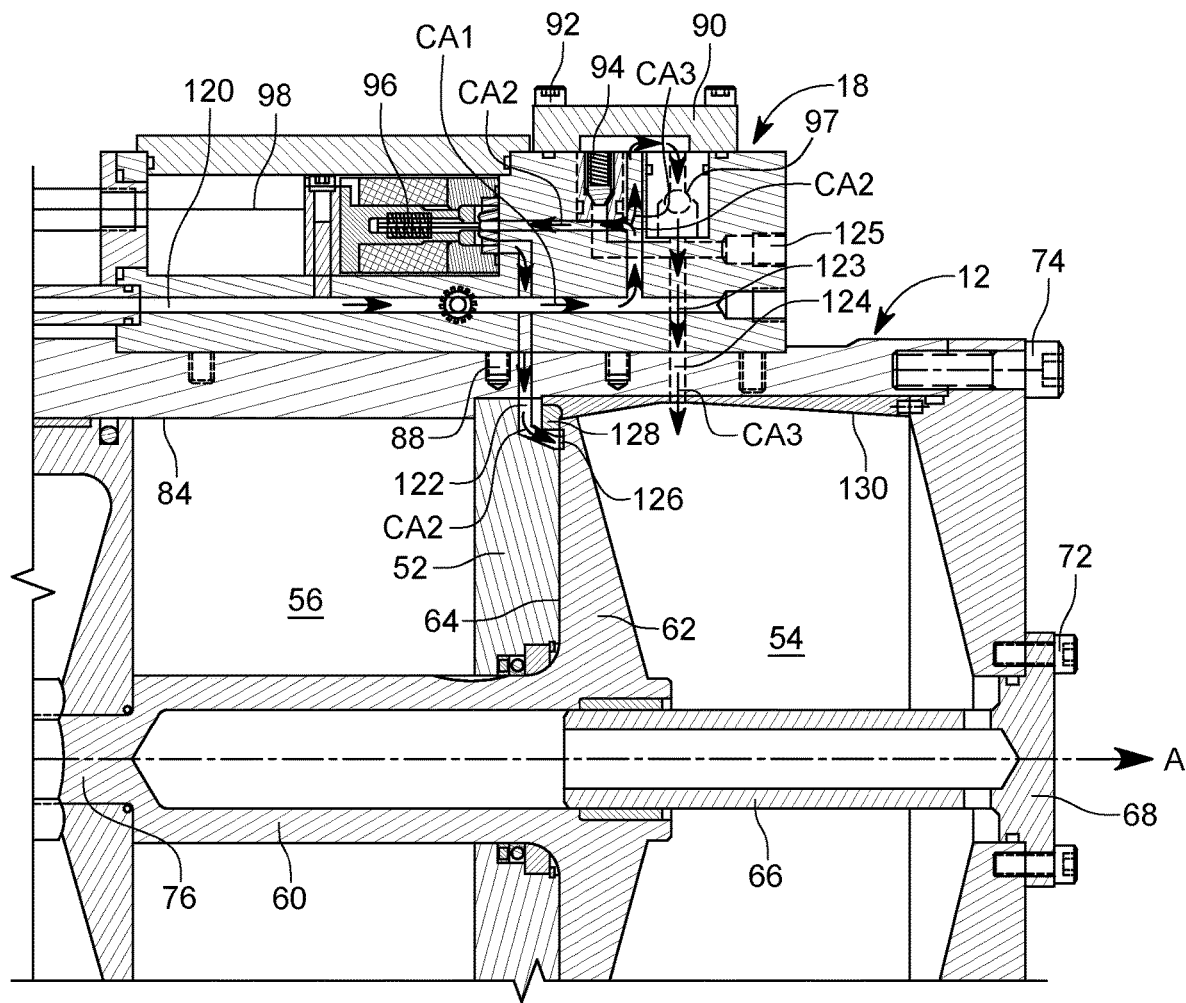

A cross-section of the seismic source 10 according to an embodiment is shown in FIGS. 5A and 5B. The operating head 12 of the seismic source 10 includes an operating head housing 50 and a bulkhead 52 that separates an interior of the housing 50 into an operating chamber 54 and an air cushion chamber 56. A shuttle assembly 58 is partially provided within the operating chamber 54 and partially within the air cushion chamber 56. In one embodiment, the entire shuttle assembly is provided within the operating head housing 50. The shuttle assembly 58 includes a shaft 60, an operating flange 62 located in the operating chamber 54, and a cup shaped firing piston 78 facing the firing chamber 16 and preventing the compressed air from the firing chamber to exit through the ports 14 while in a close state. The shuttle assembly shaft 60 is inserted through an opening in the bulkhead 52 so that the shaft extends both into the operating and cushion chambers. The sealing face 64 of the operating flange 62 is configured to be aligning against a surface of the bulkhead 52 to achieve a seal. The shaft 60 may be hollow to allow a shuttle assembly support spindle 66 to slide into the hollow shuttle assembly shaft 60. A shuttle assembly support spindle flange 68 is secured to an operating chamber head 70 using bolts 72 and the flange 68 holds the support spindle 66 in place. The operating chamber head 70 is secured to the operating chamber housing 50 using bolts 74. The shaft end 76 of the shuttle assembly shaft 60 is threaded to attach the cup shaped firing piston 78 using a cap nut 80. Rider bearings 82 are installed along the outer diameter of the cup shaped firing piston 78 to provide for the piston to freely slide along the inner walls 84 of the operating head cylindrical housing 50.

In seismic sources of the prior art, the discharge ports 104 shown as an example in FIG. 3A, are positioned behind the firing piston and the space behind the firing piston is filled with water. Therefore, the water is displaced and shoots out when the seismic source fires, which may be a cause of cavitation when firing the seismic source that could disrupt the marine ecosystem. The seismic source 10 of the present embodiment has the air cushion chamber 56 that traps low pressure compressed air behind the firing piston 78. The displacement of water is therefore eliminated as a source of cavitation when the seismic source 10 fires as there is no water behind or in front of the firing piston 78. In this regard, FIG. 5A shows that both sides of the firing piston 78 are facing air and not water. The discharge ports 14 are formed through the housing 50 near the firing chamber 16.

A specific length L for the firing chamber 16 may be selected in order to tune the rise time and slope of the primary pressure pulse. From the selected length L, the diameter of the firing chamber 16 is selected to provide a volume that with the selected operating pressure produces the desired energy output. The firing chamber 16 may be secured to the seismic source housing 50 using bolts 86.

The control block 18 is bolted to the housing 50 using bolts 88. A cover 90 is attached with bolts 92 to provide access to a pressure relief valve 94 that maintains pressure in the operating chamber 54 at least at 125 psi (861,845 kPa) higher than the pressure in the firing chamber 16, to prevent auto-firing when the firing chamber 16 is being drained. A solenoid valve 96 is connected to an electrical cable block connector 98 that distributes electricity from electrical cables 21 of the umbilical cable 30 from the exploration vessel through the electrical cables within the pipe 20 along the firing chamber 16. The pipe 20 is situated along a brace support post 42 (see FIG. 4A) of the discharge ports 14 and the electrical cables within the pipe 20 are connected to cable block connector 98. The cable block connector 98 is electrically connected to the solenoid valve 96 and the solenoid valve 96 and cable block connector 98 are within the control block 18, providing for replacement of the entire control block 18 in the case of failure. In this manner a defective solenoid valve 96 can be replaced by disconnecting the cable block connector 98 from the pipe 20 and unbolting the control block 18 from the operating head housing 50, greatly reducing down the time for failures during deployment of the seismic source 10 of the present embodiment.

Within the control block 18, a main air line 120 distributes air from the air distribution fitting 24 to an air trigger passage 122 for firing the seismic source 10 and to the operating supply line 124 to refill the operating chamber 54 with air after firing. More specifically, as shown in FIG. 5B, the main air line 120 provides the compressed air CA1 along the arrows shown in the figure. The compressed air CA1 is then split into a first stream CA2 and a second stream CA3. The first stream CA2 enters the solenoid valve 96 and is then provided along air trigger passage 122, at the seal surface 64, between (1) the flange 62 and (2) the bulkhead 52. The second stream CA3 is provided through a one-way valve 97, along a passage 123, directly into the operating chamber 54. When the compressed air CA1 is provided to charge the firing chamber 16 and the operating chamber 54, the solenoid valve 96 is closed, so that the first stream CA2 is suppressed, only the second stream CA3 is on. For this situation, the compressed air in the firing chamber 16 and the operating chamber 54 would be at the same pressure as both chambers are feed from the same main air line 120.

External air supply vents 125 are provided to release air from the operating chamber 54 once the seismic source 10 is back on the deck of the exploration vessel after deployment. The air trigger passage 122 is of a substantially shortened length as compared to seismic sources of the prior art to provide for more precise firing of the seismic source 10. The air distribution fitting 24 also provides for refilling of the firing chamber 16 after firing. Using the air distribution fitting 24, the operating chamber 54 may be filled with air and then shut off from the air supply line 22 while air continues to be supplied to the firing chamber 16 making for efficient refilling to prepare the seismic source 10 for re-firing.

When the solenoid valve 96 is actuated by an electric pulse from the firing circuit onboard the exploration vessel, a shot of air CA2 flows rapidly through the trigger air passage 122 into an annular groove 126, formed near the edge of the operating flange 62, to trigger the seismic source 10, by breaking the seal between the outside diameter of the operating flange 60 and an operating seal 128, allowing the shuttle assembly 58 to start its firing movement. The shuttle assembly 58 is being pushed by the air pressure within the firing chamber 16, across the cross sectional area of the cup shaped firing piston 78, thereby rapidly releasing air from the firing chamber 16 through the discharge ports 14 when in an open state. When firing, the shuttle assembly shaft 60 moves rapidly and smoothly through the bulkhead 52 with the operating flange 62 moving along a liner sleeve 130 that assists in controlling the air flow around the operating flange 62. In other words, the liner sleeve 130 is shaped to increase a space between the tip of the operating flange 62 and the liner sleeve so that high pressure air from the operating chamber 54 escapes past the operating flange 62, into the cushion chamber 56, which has a pressure smaller than the pressure of the operating chamber 54. In this way, the pressure in the firing chamber 16 becomes higher than the pressure in the operating chamber 54 and thus, the shuttle assembly 58 moves to the right in FIGS. 5A and 5B, to fire the source. A check valve 132 (see FIG. 5A) is positioned in the air cushion chamber 56, for outward flow only, to vent water or air from the ambient air cushion chamber 56 through drilled port 134. In other words, the high pressure air from the operating chamber 54 escapes in the cushion chamber 56, and then it further escapes outside the housing 50 of the source until the pressure inside the cushion chamber 56 becomes equal to the water pressure around the source 10. If any water seeps into the ambient air cushion chamber 56 between seismic source shots, the water is purged out through port 134 and check valve 132 by the temporary air pressure build up in the ambient air cushion chamber 56, during the time the cup shaped firing piston 78 is moving from the fired position to the right and back to reset to the ready to fire position, to the left, which results in compressing the air from the approximate ambient water pressure.

In one embodiment, an air vent passage 140 between the cushion chamber 56 and the operation chamber 54 is not drilled through the bulkhead 52. As shown in an example of a seismic source 100 of the prior art in FIG. 6A, an air vent passage 140 is commonly drilled near the bottom of operating head 12 through the bulkhead 52. The air vent passage 140 allows for air within the operating chamber 54, behind the sealing face 64 of the operating flange 62, and air within the annular groove 126 to be forced through the air vent passage 140 into the cushion chamber 56. This happens as the operating flange 62 is returning to seal against the operating seal 128, to reset the seismic source 10 to the ready to fire position for re-firing. In the prior art seismic source 100 illustrated in FIG. 6A, there are, recessed within the bulkhead 52, a close-fitting self-lubricating shaft seal ring 142 and a retainer ring 144 that prevent air from the operating chamber 54 from leaking through the center hole of the bulkhead 52, into the cushion chamber 56. The shuttle assembly shaft 60 is therefore allowed to move freely while sealing the operating chamber 54 from the air cushion chamber 56 without leakage. A retainer ring 146 holds the shaft seal ring 142 in place with the retainer ring 144 being held in place using a snap ring 148. A sliding sleeve bearing 150 is installed where the shuttle assembly shaft 60 is installed along the shuttle assembly support spindle 66.

Figure 6A:
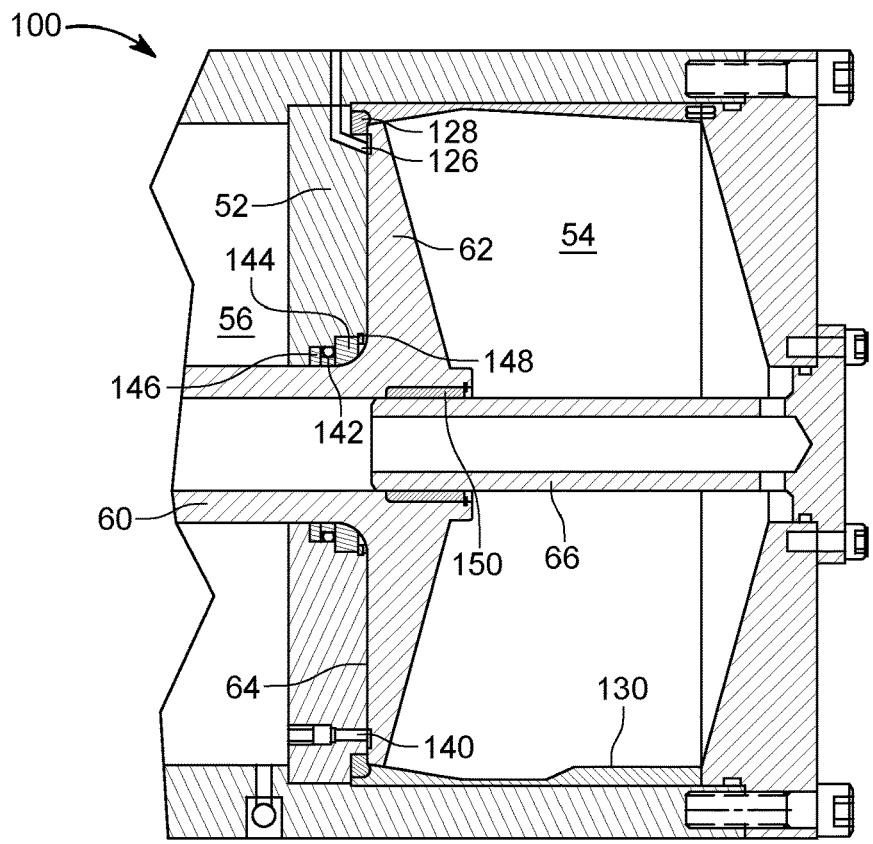
FIG. 6A is a cross-sectional view of an embodiment of an operating head in an embodiment of a seismic source of the prior art.
Figure 6B:
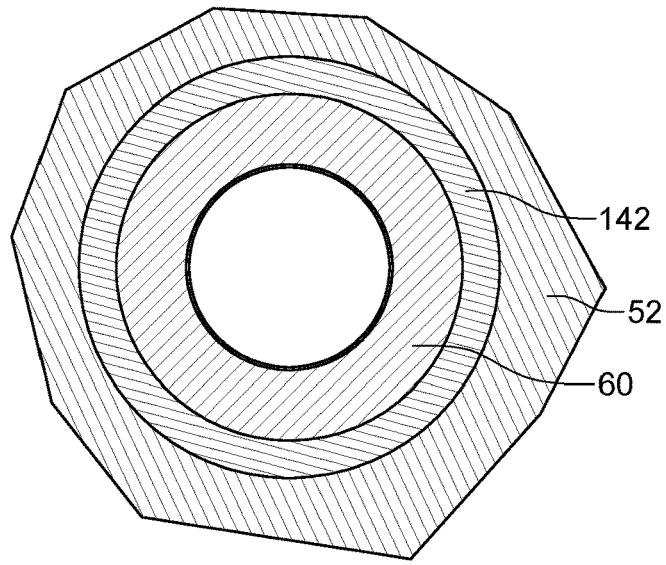
FIG. 6B is a cross-sectional view through the shuttle assembly shaft in the embodiment of the seismic source of the prior art of FIG. 6A.

When the operating flange 62 of the prior art seismic source 100 is in the set to fire position as shown in FIG. 6A, there is none or truly little air leakage around the close-fitting self-lubricating shaft seal ring 142 and a retainer ring 144. In other words, no air is leaking from the operating chamber 54 into the cushion chamber 56 along the shaft 60. When the solenoid valve 96 is actuated by an electric pulse, from the firing circuit onboard the exploration vessel, the shuttle assembly 58 accelerates and air fills behind the operating flange 62, along the sealing face 64. After the release of air from the firing chamber 16 through the discharge ports 14, air travels along the inner operating chamber sleeve 130 and around the operating flange 62, and this air pushes the shuttle assembly 58 back to the reset ready to fire position for re-firing as the movement of the operating flange 62 forces air out through the air vent passage 140. However, the diameter of the air vent passage 140 through the bulkhead 52 determines that rate at which the air can be moved out of the operating chamber 54 and the operating flange 62 can be sealed against the operating seal 128 to have the seismic source 100 of the prior art be re-fired. If the diameter of the air vent passage 140 is too small, a too small amount of air will not be evacuated quickly enough from behind the sealing face 64, and thus, the operating flange 62 will not seal against the operating seal 128. If the diameter of the air vent passage 140 is too large, there will not be a sufficient compressed air pressure supplied by the triggered solenoid valve 96 within the annular groove 126 to trigger the seismic source 100 because too much of the air will leak through the air vent passage 140 into the air cushion chamber 56, thus decreasing the differential in air pressure between the sealing face 64 and the opposing air pressure within the operating chamber 54. This means that the seismic source 100 of the prior art will not fire. The air vent passage 140 of the prior art must therefore be dimensioned properly for the volume of air within the operating chamber 54 and the operating pressure of the seismic source with differing operating pressures delaying or preventing firing if air from the operating chamber 54 is not properly evacuated through the air vent passage 140. A cross-section of the shuttle assembly shaft 60 of the prior art seismic source 100 is shown in FIG. 6B.

Figure 7A:
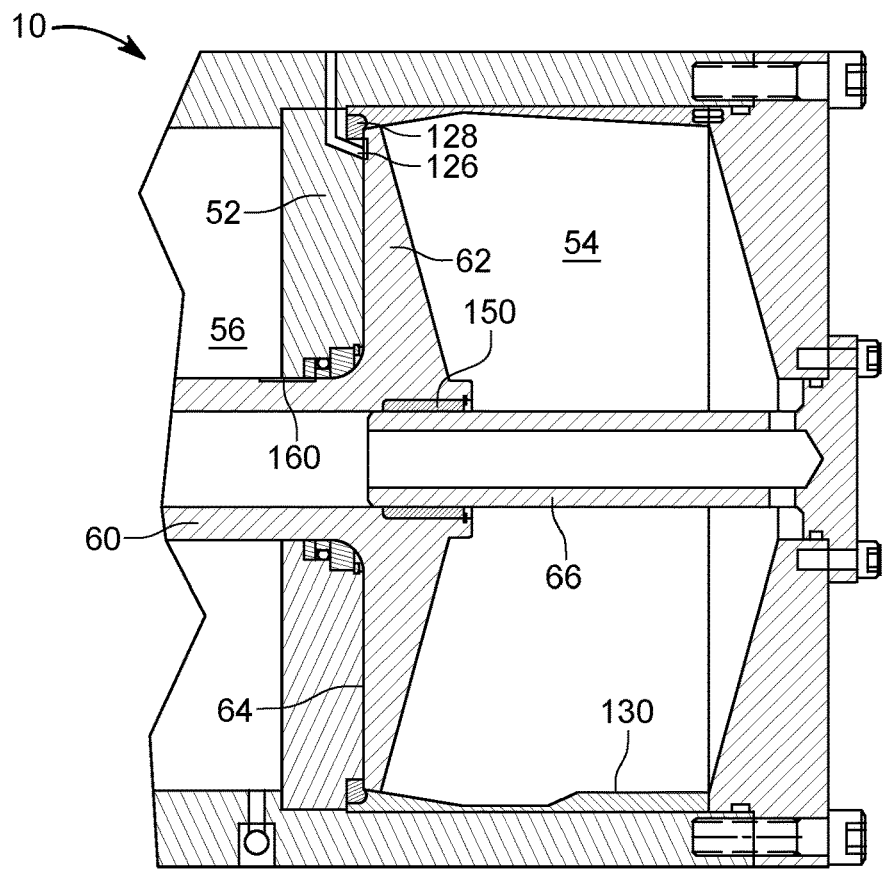
FIG. 7A is a cross-sectional view of an embodiment of an operating head in an embodiment of the seismic source of the present invention.
Figure 7B:
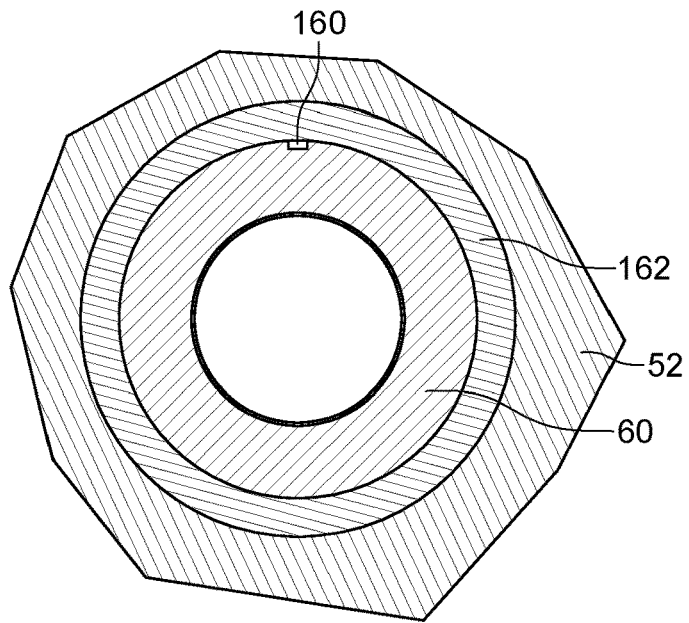
FIG. 7B is a cross-sectional view through the shuttle assembly shaft in the embodiment of the seismic source of the present invention of FIG. 7A.
Figure 8B:
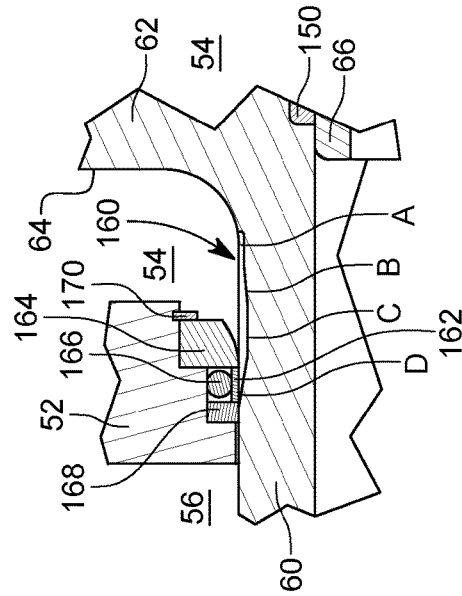
FIG. 8B is a cross-sectional view of an embodiment of the shuttle shaft vent channel of FIG. 8A showing air flow in an embodiment of the seismic source of the present invention.
Figure 8A:
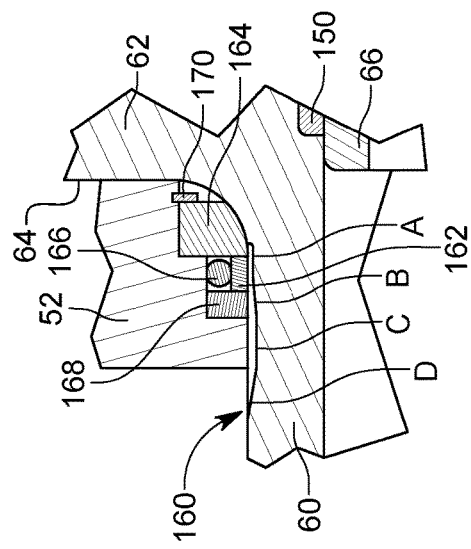
FIG. 8A is a cross-sectional view of an embodiment of shuttle shaft vent channel in an embodiment of the seismic source of the present invention.

In a quite different design from the prior art, the seismic source 10 of the embodiment illustrated in FIG. 7A, evacuates the air from the operating chamber 54, after firing, through a shuttle shaft vent channel 160 instead of using the air vent passage 140 through the bulkhead 52 as in FIG. 6A. In other words, the bulkhead 52 has only one opening, that accommodates the shaft 60. As shown in a cross-section through the shuttle assembly shaft 60 in FIG. 7B, the shuttle shaft vent channel 160 is cut along the shuttle shaft 60. FIGS. 8A-8D show the spatial arrangement of the shuttle shaft vent channel 160 relative to the various other elements of the source and also the varying profile of the vent channel, which is indicated by letters A to D. Note that letter A indicates a small depression or groove or channel into the shaft 60, which is followed by an increasing depression B, followed by the largest depression C and finally a decreasing depression D. The starting end of the depression A and the last end of the depression D are flush with the original exterior surface of the shaft 60. In other words, a depth of the depressions A to D vary from the surface of the shaft 60 to a largest depth corresponding to depression C (i.e., regions B and D have a variable depth, constant gradient, while region C has a constant depth; region A is a mixed depth region, i.e., it has an initial portion of a variable depth followed by a constant depth portion) and then smoothly returns to the surface of the shaft 60. The term depth is considered in a direction that is perpendicular to the longitudinal axis of the shaft. Also note that FIG. 8A shows a small space or channel formed between the depression A and a slipper seal 162, which allows a small air flow along the depression. However, the amount of air that can flow through the depression B increases until reaching the maximum amount for depression C. Then, the amount of air flowing through the depression C decreases until reaching zero when the depression ends and the surface of the shaft 60 contacts the slipper seal 162. The depressions A to D are arranged (sequentially in this embodiment) so that they form an air passage with the slipper seal 162 while the external surface of the shaft 60 intimately connects to the slipper seal 162 so that no air flow passes at the interface between the slipper seal 162 and the external surface of the shaft 60. While the figures show four depressions A to D, one skilled in the art would understand that any number of depressions equal to 2 or larger may be used as long as a depth of the air passage defined between the depressions and the slipper seal 162 varies along the longitudinal axis of the shaft 60.

Figure 8D:
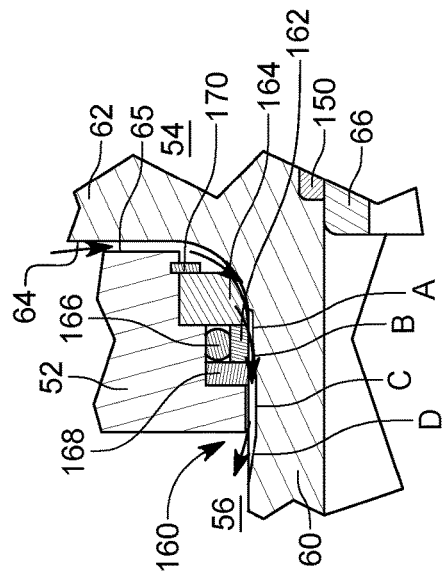
FIG. 8D is a cross-sectional view of an embodiment of the shuttle shaft vent channel of FIG. 8A showing air flow in an embodiment of the seismic source of the present invention.
Figure 8C:
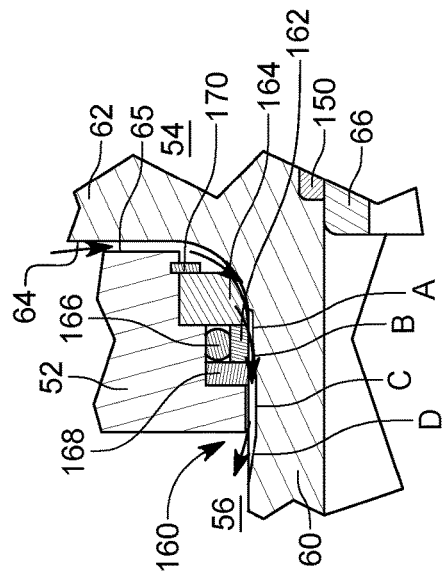
FIG. 8C is a cross-sectional view of an embodiment of the shuttle shaft vent channel of FIG. 8A showing air flow in an embodiment of the seismic source of the present invention.

Because of the configuration discussed herein, the movement of the shuttle assembly shaft 60 through the bulkhead 52 as the seismic source 10 of the present embodiment is fired, determines a varying airflow, which changes with the location of the operating flange 62 relative to the bulkhead 52, as shown with arrows through the shuttle shaft vent channel 160 in FIGS. 8C and 8D. As the shuttle assembly 58 returns to a reset ready to fire position, where the operating flange 62 seals against the operating seal 128 for re-firing, as shown in FIG. 7A, the air flow from the operating chamber 54 into the cushion chamber 56 is modulated by the varying profile of the depressions A to D. As shown in FIG. 8A, in the ready to fire position, the slipper seal 162 and a retaining ring 164 almost seal the shuttle assembly shaft 60 to the bulkhead 52, i.e., there is a small channel (defined by the depression A) between the slipper seal 162 and the shaft 60 so that a small amount of air can leak, if necessary. The slipper seal 162 has a flat surface of a Teflon compound for durability. Thus, the slipper seal 162 can slide along the surface of the shuttle assembly shaft 60 for thousands of shots of the seismic source 10 without wear or deterioration. An O-ring 166 may be present to compress the slipper seal 162 towards or against the shuttle assembly shaft 60 and a back-up ring 168 prevents the slipper seal 162 from extruding out along the axis A of the shuttle assembly shaft 60. A snap ring 170 secures the retaining ring 164 in place to have the shuttle assembly shaft 60 slide smoothly over the small shuttle shaft vent channel 160 formed along the surface of the shuttle assembly shaft 60. Note that other elements may be used for holding the slipper seal 162 in place, instead of the elements discussed above.

As shown in FIG. 8A, the shuttle shaft vent channel 160 is cut into the shuttle assembly shaft 60 at different depths, denoted with the letters A, B, C, and D. The varying depths of the shuttle shaft vent channel 160 provide varied rates of air flow through the shuttle shaft vent channel 160 as appropriate for the degree of venting required, for example, for the rate of air flow when firing, or for the rate of air flow when the operating flange 62 is moving to be reset to the ready to fire position. When the shuttle assembly 58 is in the ready-to-fire position, as illustrated in FIG. 8A, the sealing face 64 of the operating flange 62 is sealed against the operating seal 128 and the operating flange 62 is located against the bulkhead 52. Thus, the initial shallow portion A of the shuttle shaft vent channel 160 is in the initial low venting position beneath the slipper seal 162, which allows a small air leakage. When the seismic source 10 of the present embodiment is fired, as shown in FIG. 8B, the shuttle assembly 58 quickly moves towards opening to the right, moving the shuttle shaft 60 with the vent channel 160 through the bulkhead 52 and thereby shutting off venting from the operating chamber 54 to the cushion chamber 56, as the compressed air is rapidly released from the firing chamber 16 through the discharge ports 14 (not shown). Within a fraction of a second, the air pressure from the firing chamber 16 diminishes and the compressed air from the operating chamber 54 is larger than the compressed air in the firing chamber 16. This pressure difference acts on the operating flange 62, and moves the shuttle assembly 58 back toward the firing chamber 16. At this time, air is released from the operating chamber 54, through the outlet portion D of the shuttle shaft vent channel 160, into the cushion chamber 56, so that the flange 62 contacts again the bulkhead 52 to establish the seal 64. As the operating flange 62 moves closer towards the bulkhead 52 after firing, air flows below the slipper seal 162 and through the shuttle shaft vent channel 160 at the longer and deeper depth along portion C, as shown by the arrows in FIG. 8C, and then through the transition portion B, as the shuttle assembly shaft 60 continues moving toward the bulkhead 52. Then the slipper seal 162 moves over the shallowest portion A, as shown in FIG. 8D, evacuating a smaller amount of air from the operating chamber 54, which is sufficient to seal the operating flange 62 to the operating seal 128. This operation returns the shuttle assembly 58 to the reset ready to fire position as shown in FIG. 8A, to re-fire the seismic source 10 of the present invention. Thus, the varying profile of the shaft 160, which is defined by the plural depressions A to D, modulates the amount of air that flows from the operating chamber 54 to the cushion chamber 56 to achieve the desired seal between the flange 62 and the operating seal 128, while controlling a speed of movement of the shuttle assembly 58.

Advantageously, when the source shuttle assembly 58 is in the ready to fire position as shown in FIG. 8A, and FIG. 5A, the corresponding vent area of portion A is small so that when the seismic source 10 is triggered by a puff of air from the solenoid valve 96, which is delivered through firing air passage 122, to trigger the seismic source to fire, the amount of compressed air passing through the vent area of portion A is correspondingly small. This allows the air pressure to build up in the annular groove 126 more quickly, to break the sealing of the operating flange 62 to the operating seal 128, thus causing the shuttle assembly 58 to more quickly accelerate in the direction of opening the discharge ports 14 than experienced when using the previous fixed sized orifice of the air vent passage 140 of the prior art. After triggering and firing the seismic source 10, the shuttle assembly 58 returns towards the sealing position and the operating flange 62 moves air from within the annular groove 126 and along the sealing face 64 of the operating flange 62 to flow through the shuttle shaft vent channel 160. As shown in FIG. 8D a sufficient amount of air is evacuated from the area between the sealing face 64 and the flat face 65 of the bulkhead 52 to seal the operating flange 62 to the operating seal 128, thus returning the shuttle assembly 58 to the reset ready to fire position as shown in FIG. 8A.

Figure 9:
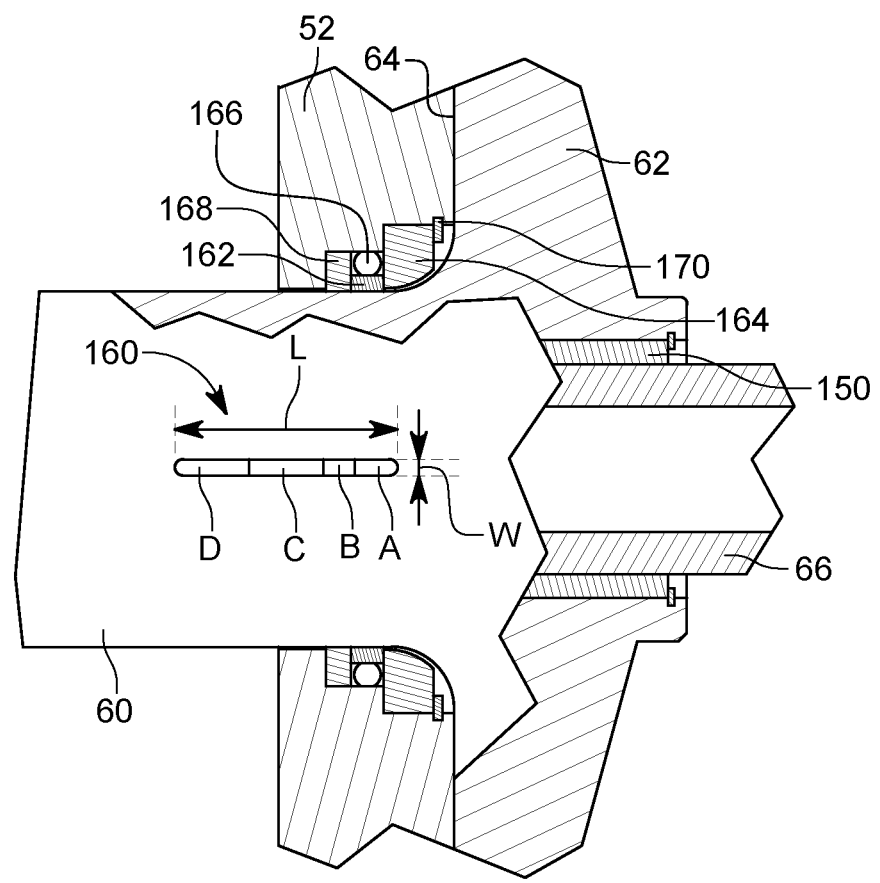
FIG. 9 is a top view of an embodiment of the shuttle shaft vent channel of FIG. 8A in an embodiment of the seismic source of the present invention.

A view from the top of the shuttle assembly shaft 60 is shown in FIG. 9 showing the width W of the shuttle shaft vent channel 160 that may be on the order of 1.57 mm (1/16") to 6.35 mm (1/4") and more preferably 3.18 mm (1/8"). In some embodiments the width W may be along the length L of the shuttle shaft vent channel 160. In a comparison to the prior art, the firing of the seismic source 10 of the present invention is more accurate and rapid because by directing the release of air through the center instead of an air vent passage 140 through the bulkhead 52, the annular groove 126 can completely fill before air is released through the shuttle shaft vent channel 160, thus providing a balanced change in pressure with an evenly distributed increase in pressure across the sealing face 64 of the operating flange 62. This change in pressure with the force of the air pressure of the firing chamber 16 against the cup-shaped firing piston 78 moves the shuttle assembly 58 to release the air from the firing chamber 16 through the discharge ports 14. Although FIG. 9 shows only one set of depressions A to D, those skilled in the art would know, after reading this specification, that more sets of depressions may be made in the shaft 160, as desired. Also, the number of depressions may be modified, i.e., to be less or more than 4.

Figure 10:
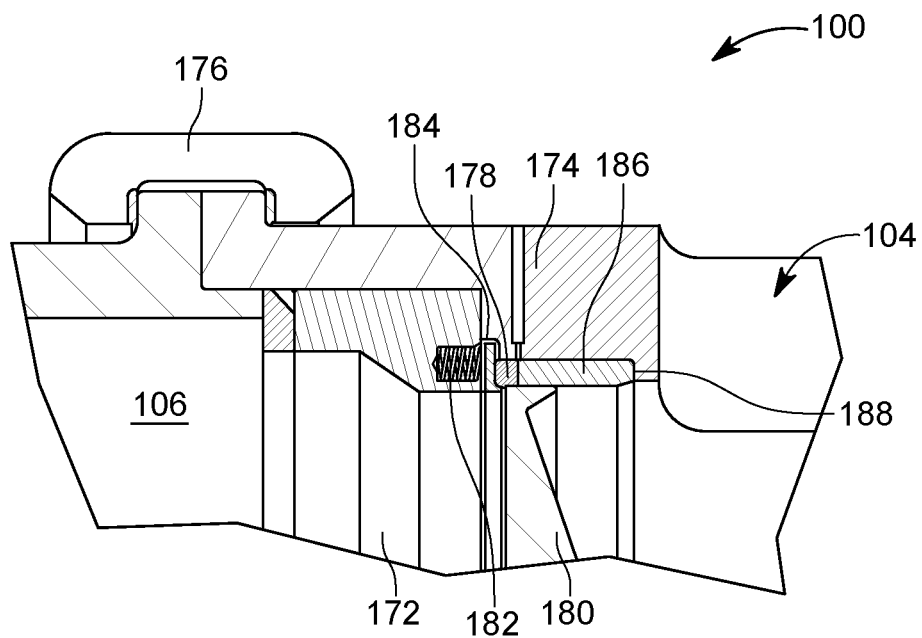
FIG. 10 is a cross-sectional view of an embodiment of a firing chamber having a firing seal in an embodiment of a seismic source of the prior art.

Another innovation of the seismic source 10 according to another embodiment, which may be combined with the previous innovations/embodiments discussed herein, is the design of the firing chamber seal that is necessary to maintain the discharge ports 14 in a closed ready to fire position. In a seismic source 100 of the prior art, an example of which is shown in FIG. 10, the firing chamber housing 172 is attached to the operating head housing 174 using a clamping ring 176 instead of bolts. A firing chamber seal 178 is held against the shuttle firing flange 180 by using firing seal loading springs 182 and a retaining ring 184. When firing, the shuttle firing flange 180 moves along a firing flange sleeve 186 that is positioned within a recess 188 within the operating head housing 174. The discharge ports 104 are positioned behind the shuttle firing flange 180 and the firing flange sleeve 186. In this design commonly used in seismic sources and air guns of the prior art, an acceleration distance is created as air that is released from the firing chamber 106 with the movement of the shuttle firing flange 180, away from the firing chamber seal 178, must travel along the firing flange sleeve 186 to then be released through the discharge ports 104. An increase in the acceleration distance may be a source of cavitation, creating undesirable high and very high frequencies. In this example of a design for the firing chamber seal 178, the acceleration distance cannot be adjusted, i.e., it is fixed. The acceleration distance can also not be zero, because of the distance that the shuttle firing flange 180 travels from the release of air from the firing chamber 106 with the separation of the shuttle firing flange 180 from the firing chamber seal 178 along the firing flange sleeve 186 to the discharge ports 104.

Figure 11:
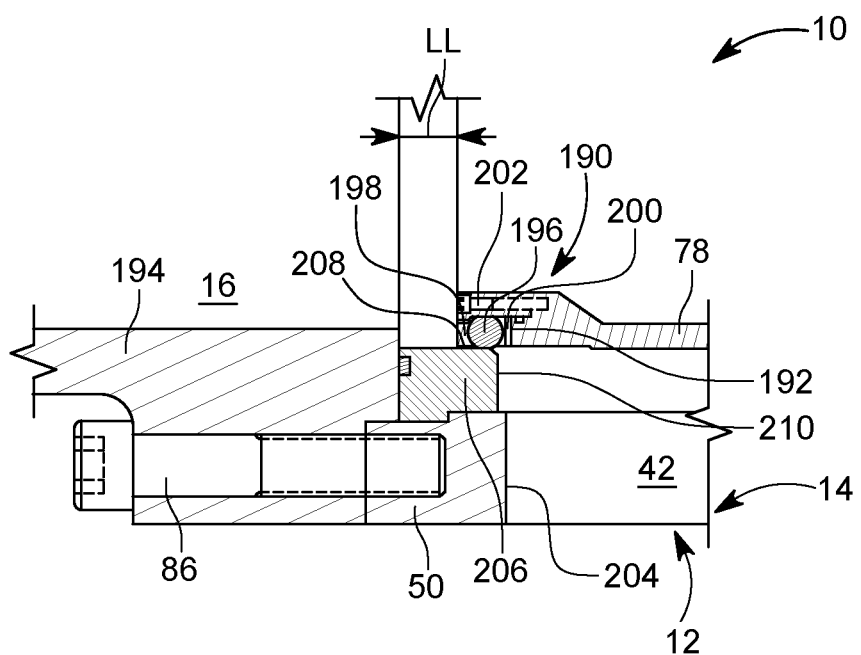
FIG. 11 is a cross-sectional view of an embodiment of a firing piston having a firing seal and an embodiment of a firing seal sealing ring having a sealing surface of a specific length to set the acceleration distance in an embodiment of the seismic source of the present invention.

In an advantage and improvement of the prior art seismic sources, the seismic source 10 of the present embodiment, is configured to adjust the acceleration distance, e.g., it can be, if desired, zero because a novel firing chamber seal assembly 190 is adjacent to the firing chamber 16 and to the ports 14, and, if desired, the acceleration distance may be adjusted as now discussed. In embodiments of the present invention, the firing chamber seal assembly 190 is installed facing outwardly at the open end of the cup-shaped firing piston 78, as shown in FIG. 11. In this example, the firing seal assembly 190 is housed within a recess 192 along the outer edge of the cup-shaped firing piston 78 instead of within the firing chamber housing 194. The firing seal assembly 190 includes a firing seal 196 installed between a front-retaining ring 198 and the contoured surface 200 of the cup shaped firing piston 78. In one embodiment, the firing seal assembly 190 is being bolted on to the outer edge of the cup-shaped firing piston 78 using bolts 202. The firing chamber 16 is bolted onto the operating head 12 with bolts 86 that extend through the firing chamber housing 194 into the operating head housing 50.

In the embodiment shown in FIG. 11, the interior surface of a firing seal sealing ring 206 provides a sealing surface 208 that the firing seal 196 seals against. When the seismic source 10 of the present embodiment is fired the short distance between (1) the outer surface 210 of the sealing ring 206 and (2) the edge 204 of the discharge ports 14, it provides the acceleration distance as the distance that the cup-shaped firing piston 78 must travel before the compressed air is released from the firing chamber 16 through the discharge ports 14, as the firing seal 196 moves past the firing seal sealing ring 206. Note that the firing seal 196 is located away from the firing chamber housing 194 by a distance LL. In one embodiment, the distance LL is different from zero. The firing seal 196 only interacts with the sealing ring 206 for achieving the seal between the cup-shaped firing piston 78 and the sealing ring 206. This seal prevents the compressed air from the firing chamber 16 to exit the ports 14.

A short acceleration distance (i.e., the distance that the firing seal 196 travels, while in direct contact with the sealing ring 206, and while maintaining the compressed air exclusively within the firing chamber 16), lower operating pressures and longer high-volume firing chambers increases the amount of low frequencies within the frequency content of the output pulse for the source 10 in this embodiment. A longer acceleration distance increases the very high frequencies in the frequency content of the output pulse. However, an increase in the acceleration distance in designs of the prior art may also introduce or increase jets of air and cavitation through leakage between the shuttle firing flange 180 and the operating head housing 174 as the shuttle firing flange 180 begins to travel and air escapes around the shuttle firing flange 180 and the operating head housing 174. If leakage occurs, then the longer the acceleration distance, the greater the leakage of air and this leakage prior to firing may cause undesirable and unusable high frequencies in the prior art sources.

Contrary to this downside of the prior art sources, the firing chamber seal assembly 190 of the present embodiment can be configured to have a short acceleration distance (even zero), so that no very high frequencies are generated. The front-retaining ring 198 and the contoured surface 200 of the cup shaped firing piston 78 align and hold the firing seal 196 against the sealing surface 208 of the firing seal sealing ring 206 prior to reaching the edge 204 of the discharge ports 14. The firing seal sealing ring 206 is made, in one embodiment, of a strong low friction material such as, for example, polyether ether ketone (PEEK) engineering plastic that maintains a seal as the firing seal 196 travels along the sealing surface 208, thus preventing leakage that may generate high and very high frequencies within the output pulse over thousands of shots of the seismic source 10.

This innovation of the present embodiment provides for an adjustment to the length of the sealing surface 208 of the firing seal sealing ring 206 to adjust the acceleration distance of the seismic source 10 and thereby the mixture of low and high frequencies within the frequency content of the output pulse without the introduction of leakage that may cause cavitation and undesirable and unusable high frequencies. A desired balance of low and high frequencies can be achieved simply through the selection of the length of the sealing surface 208 and the installation between the operating head 12 and the firing chamber 16 of the appropriate firing seal sealing ring 206 having that sealing surface 208 length. In the embodiment shown in FIG. 11, the outer surface 210 of the firing seal sealing ring 206 extends short of the edge 204 of the discharge ports 14, thus providing a very short length of sealing surface 208 and therefore zero or minimal acceleration distance, meaning an increase in low frequencies in the frequency content of the output pulse.

Figure 12B:
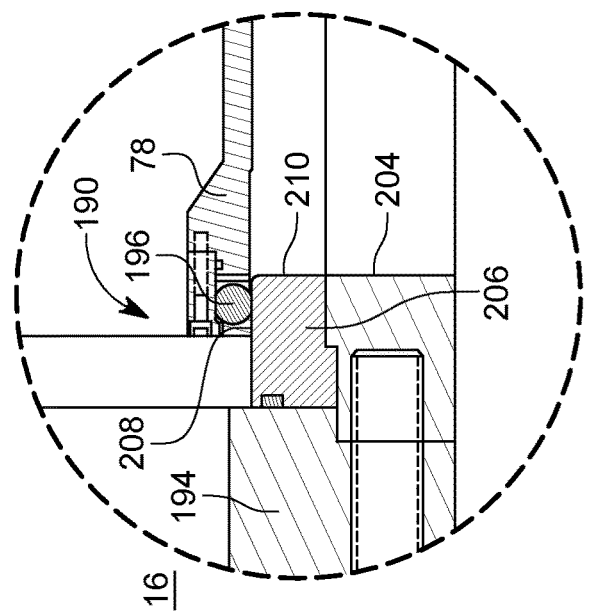
FIG. 12B is an inset of the cross-sectional view of an embodiment of a firing piston having a firing seal and the other embodiment of a firing seal sealing ring to set the acceleration distance of FIG. 12A in an embodiment of the seismic source of the present invention.
Figure 12A:
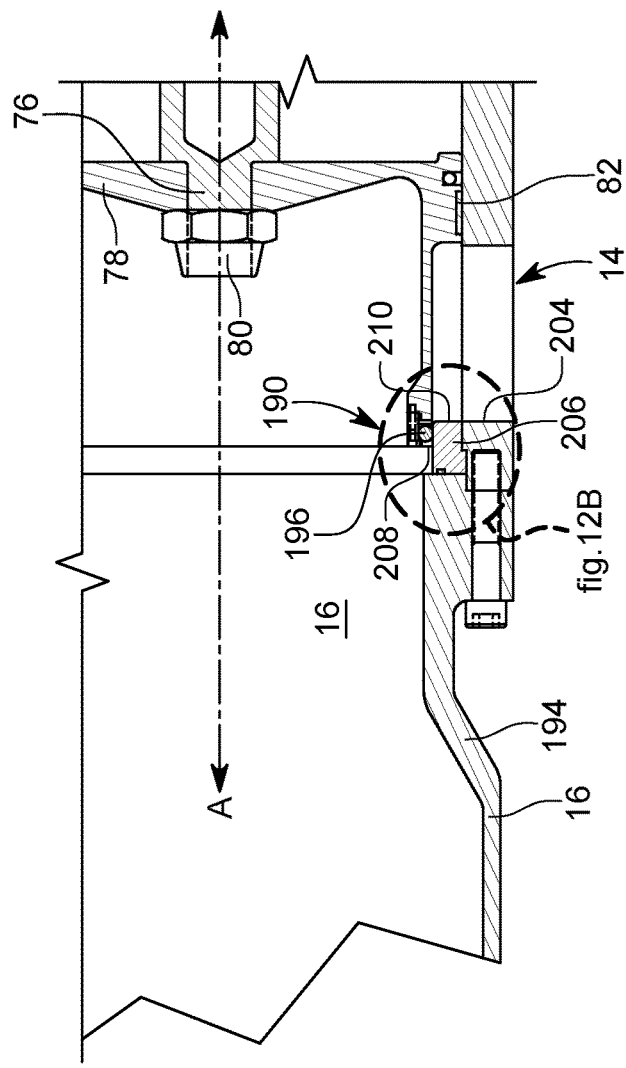
FIG. 12A is a cross-sectional view of an embodiment of a firing piston having a firing seal and another an embodiment of a firing seal sealing ring having a sealing surface of a specific length to set the acceleration distance in an embodiment of the seismic source of the present invention.
Figure 12D:
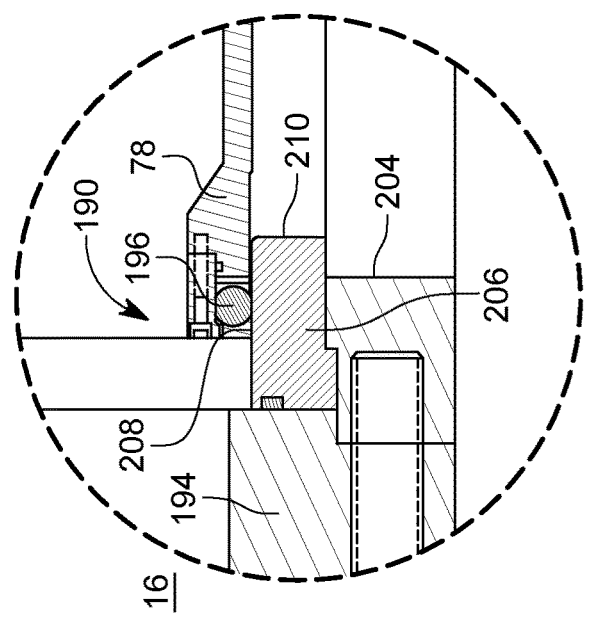
FIG. 12D is an inset of the cross-sectional view of an embodiment of a firing piston having a firing seal and the still other embodiment of a firing seal sealing ring to set the acceleration distance of FIG. 12C in an embodiment of the seismic source of the present invention.
Figure 12C:
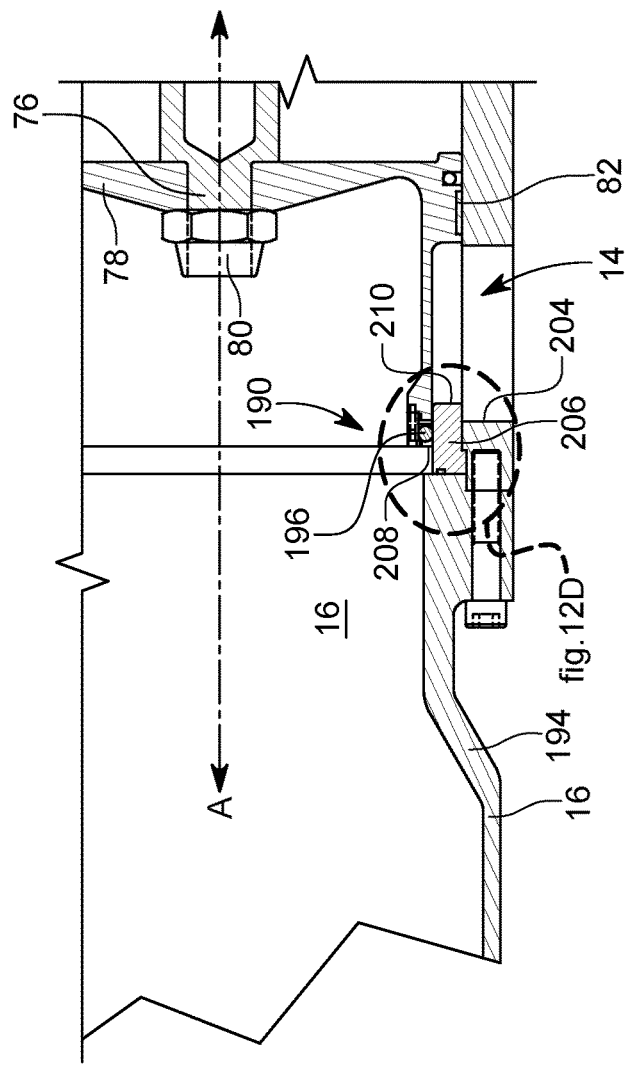
FIG. 12C is a cross-sectional view of an embodiment of a firing piston having a firing seal and a still other embodiment of a firing seal sealing ring having a sealing surface of a specific length to set the acceleration distance in an embodiment of the seismic source of the present invention.
Figure 12F:
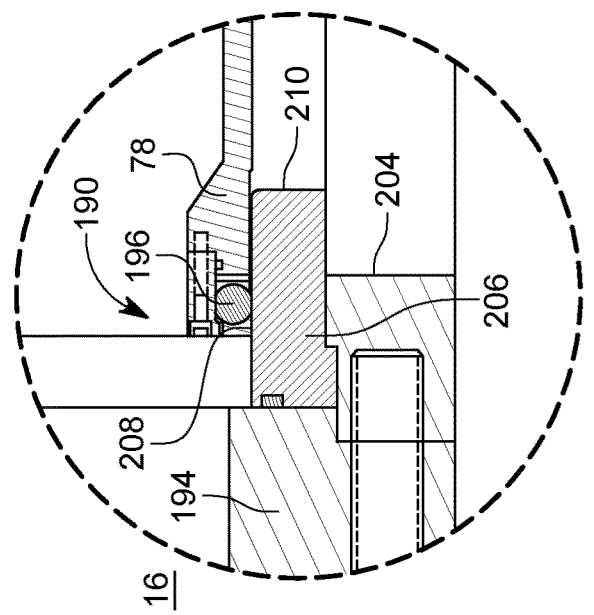
FIG. 12F is an inset of the cross-sectional view of an embodiment of a firing piston having a firing seal and the still further embodiment of a firing seal sealing ring to set the acceleration distance of FIG. 12E in an embodiment of the seismic source of the present invention.
Figure 12E:
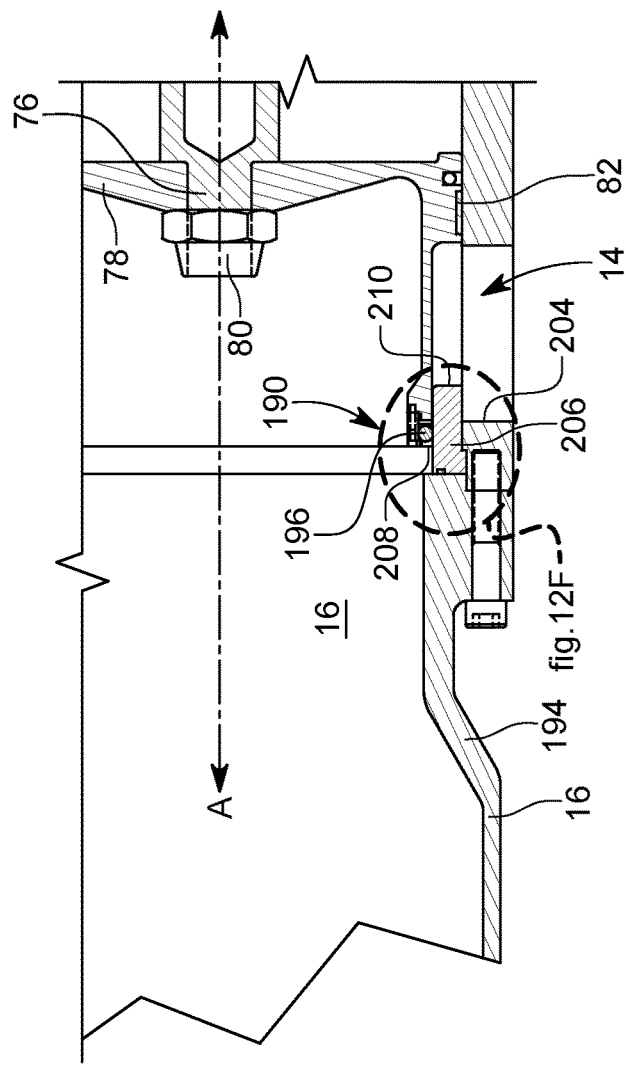
FIG. 12E is a cross-sectional view of an embodiment a firing piston having a firing seal and a still further embodiment of a firing seal sealing ring having a sealing surface of a specific length to set the acceleration distance in an embodiment of the seismic source of the present invention.

In another embodiment as shown in FIG. 12A and FIG. 12B, the outer surface 210 of the firing seal sealing ring 206 is in line (i.e., flush) with the edge 204 of the discharge ports 14, thus providing a slightly longer sealing surface 208 when compared to the embodiment of FIG. 11, but still zero or minimal acceleration distance since the release of air from the firing chamber 16 is immediate at the point in time when the sealing ring 196 is forced away from firing seal sealing ring 206. The short adjustment to the length of the sealing surface 208 in this example may slightly increase the high frequencies in the frequency content of the output pulse. In another embodiment as shown in FIG. 12C and FIG. 12D, the outer surface 210 of the firing seal sealing ring 206 extends past the edge 204 of the discharge ports 14, thus providing a longer sealing surface 208 and therefore a longer acceleration distance. The longer acceleration distance implies a slight increase in the very high frequencies in the frequency content of the output pulse. In yet another embodiment as shown in FIG. 12E and FIG. 12F, the outer surface 210 of the firing seal sealing ring 206 extends more over the edge 204 of the discharge ports 14, thus providing an even longer sealing surface 208 and therefore, an even longer acceleration distance. The longer acceleration distance implies an even larger increase in the high frequencies in the frequency content of the output pulse. With each incremental change in length of the sealing surface 208, the frequency content of the output pulse is adjusted from an increase in low frequencies with a zero or very short acceleration distance, to a moderate increase in the very high frequencies as the length of the sealing surface 208 is increased, and therefore, the acceleration distance is increased. These examples only indicate the capability of the novel source 10 of being configured to adjust its frequency content depending on the environmental conditions. It is obvious that the embodiment illustrated in FIG. 11 is preferable when marine life is expected to be around the seismic sources, as this embodiment generates the smallest amount of high and very high frequencies. The seismic source 10 of the present embodiment therefore provides zero acceleration distance, if desired, (see FIG. 11) or an adjustment to the acceleration distance (see FIGS. 12A to 12E) to adjust the mixture of low and high frequencies within the frequency content of the output pulse.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the seismic source of the present invention to particular applications, without departing from the scope of the following claims and equivalents of the claimed elements.

The invention claimed is:

1. A seismic source for generating seismic waves under water, the seismic source comprising:
an operating head having plural discharge ports;
a firing chamber attached to the operating head, the firing chamber configured to hold compressed air to be discharged through the plural discharge ports; and
a shuttle assembly having a shaft located within the operating head and the shuttle assembly is configured to prevent the compressed air in the firing chamber to enter the plural discharge ports when in a close state, and to allow the compressed air in the firing chamber to be discharged through the plural discharge ports when in an open state,
wherein, the operating head has an operating chamber and a cushion chamber, the shaft extends into both the operating chamber and the cushion chamber,
wherein the shaft has a longitudinal channel having a varying depth, such that air is released from the operating chamber, through the longitudinal channel, into the cushion chamber, at varied rates of air flow.

2. The seismic source of claim 1, further comprising:
a bulkhead located within the operating head and configured to separate the operating chamber from the cushion chamber,
wherein the bulkhead has only one opening in which the shaft fits.

3. The seismic source of claim 1, wherein the channel has at least two different regions, a first region having a constant depth and a second region having a variable depth.

4. The seismic source of claim 1, wherein the channel includes two or more depressions having different depths.

5. The seismic source of claim 1, the operating head having an operating chamber and a cushion chamber, the shaft extending in both the operating chamber and the cushion chamber, and the seismic source comprising a bulkhead located within the operating head and configured to separate the operating chamber from the cushion chamber, the bulkhead having only one opening in which the shaft fits,
wherein there is a free space between a surface of the bulkhead that defines the opening and the channel, in the close state, that allows air to leak from the operating chamber to the cushion chamber.

6. The seismic source of claim 1, the operating head having an operating chamber and a cushion chamber, the shaft extending in both the operating chamber and the cushion chamber, and the seismic source comprising a bulkhead located within the operating head and configured to separate the operating chamber from the cushion chamber, the bulkhead having only one opening in which the shaft fits, wherein the seismic source further comprises:
a slipper seal located in the bulkhead and configured to press directly against an exterior surface of the shaft, but not in the channel so that air leaks through the channel.

7. The seismic source of claim 1, further comprising:
tow ears attached only to the firing chamber so that a rigging that connects the tow ears to a float does not interfere with a bubble generated by the seismic source in the open state.

8. The seismic source of claim 1, wherein the plural discharging ports include at least four ports so that upon firing the seismic source, an output pulse is a substantially round bubble.

9. The seismic source of claim 1, wherein the firing chamber has a length that is at least eight times an outside diameter of the operating head at the plural discharge ports.

10. The seismic source of claim 1, the operating head having an operating chamber and a cushion chamber, the shaft extending in both the operating chamber and the cushion chamber, the seismic source further comprising:
an operating seal located in the operating chamber; and
an operating flange attached to the shaft and having an annular groove, the operating flange configured to seal with the operating seal in the close state so that no air leaks from the operating chamber to the cushion chamber.

11. The seismic source of claim 1, the operating head having an operating chamber and a cushion chamber, the shaft extending in both the operating chamber and the cushion chamber, the seismic source further comprising:
a firing piston attached to the shaft and configured to separate the firing chamber from the cushion chamber; and
a firing seal sealing ring located between a housing of the firing chamber and a housing of the operating head, the firing seal sealing ring being configured to seal the firing piston to the firing chamber so that the compressed air from the firing chamber does not discharge through the plural discharge ports when in the close state.

12. The seismic source of claim 1, wherein the firing seal sealing ring has a sealing surface that is selected to extend from the housing of the firing chamber up to one of a position (i) before an edge of the plural discharge ports, (ii) on the edge of the plural discharge ports, or (iii) past the edge of the plural discharge ports, and wherein, through the selection of a length of the firing seal sealing ring, an acceleration distance is selected to set a mixture of low and higher frequencies in a frequency content of an output pulse of the seismic source.

13. The seismic source of claim 1, wherein the firing seal sealing ring is installed on the firing piston.

14. The seismic source of claim 1, wherein the firing seal sealing ring is made of engineered plastic.

15. The seismic source of claim 1, wherein the firing piston is shaped as a cup having the firing seal sealing ring.

16. The seismic source of claim 1, wherein the seismic source is configured so that, when triggered beneath a surface of a body of water, the operating head is free to move upwardly and downwardly, without mechanical restraint in reaction to forces applied to the seismic source by an air bubble, wherein a motion of the seismic source is dampened in a non-destructive manner by surrounding water.

17. The seismic source of claim 8, wherein the plural discharging ports include at least five ports.

18. The seismic source of claim 16, wherein the operating head is free to move by pivoting.

* * * * *